(12) United States Patent
Zhang

(10) Patent No.: US 11,856,611 B2
(45) Date of Patent: Dec. 26, 2023

(54) METHOD AND DEVICE FOR DETERMINING A TYPE OF RANDOM ACCESS PROCEDURE

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 190 days.

(21) Appl. No.: 17/364,887

(22) Filed: Jul. 1, 2021

(65) Prior Publication Data

US 2022/0007422 A1 Jan. 6, 2022

(30) Foreign Application Priority Data

Jul. 2, 2020 (CN) .......................... 202010625895.3

(51) Int. Cl.
*H04W 74/08* (2009.01)
*H04W 24/10* (2009.01)
*H04W 74/00* (2009.01)

(52) U.S. Cl.
CPC ....... *H04W 74/0833* (2013.01); *H04W 24/10* (2013.01); *H04W 74/008* (2013.01)

(58) Field of Classification Search
None
See application file for complete search history.

(56) References Cited

U.S. PATENT DOCUMENTS

| | | | |
|---|---|---|---|
| 2018/0205516 A1* | 7/2018 | Jung | H04L 5/0007 |
| 2018/0279376 A1* | 9/2018 | Dinan | H04W 52/50 |
| 2020/0196264 A1* | 6/2020 | Shih | H04W 74/0833 |
| 2020/0252967 A1* | 8/2020 | Ozturk | H04W 56/001 |
| 2020/0252975 A1* | 8/2020 | Lei | H04B 7/01 |
| 2021/0227586 A1* | 7/2021 | Huang | H04W 52/242 |
| 2022/0046727 A1* | 2/2022 | Xu | H04W 74/0866 |

FOREIGN PATENT DOCUMENTS

| | | | | |
|---|---|---|---|---|
| WO | WO-2020221861 A1 | * | 11/2020 | |
| WO | WO-2021043416 A1 | * | 3/2021 | |
| WO | WO-2021057897 A1 | * | 4/2021 | ........... H04L 5/0053 |

OTHER PUBLICATIONS

Fujitsu "On Procedure Selection Among 2-Step and 4-Step RACH", Agenda Item 11.13, Document No. R2-1903782, dated Apr. 8-12, 2019. (Year: 2019).*

* cited by examiner

*Primary Examiner* — Jamaal Henson

(57) ABSTRACT

The present disclosure provides a method and device used in communication node for wireless communication. A communication node receives a first signaling; generates a first data block in a first radio state; when a first condition set is satisfied, transmits a first signal; and when the first condition set is not satisfied, transmits a second signal; the first signaling is used to determine a first threshold, the first threshold being a positive integer; the first condition set comprises a size relation between a first data size and the first threshold; the first data block comprises more than one bit, and the first data size is equal to a number of bits comprised in the first data block; the first signal is used for a first-type Random Access (RA) procedure, and the second signal is used for a second-type RA procedure; the first signal carries a first sequence.

20 Claims, 5 Drawing Sheets

METHOD AND DEVICE FOR DETERMINING A TYPE OF RANDOM ACCESS PROCEDURE

CROSS REFERENCE TO RELATED APPLICATIONS

This application claims the priority benefit of Chinese Patent Application No. 202010625895.3, filed Jul. 2, 2020, the full disclosure of which is incorporated herein by reference.

BACKGROUND

Technical Field

The present disclosure relates to transmission methods and devices in wireless communication systems, and in particular to a transmission method and device related to small packet service.

Related Art

New Radio (NR) supports Radio Resource Control (RRC) INACTIVE state. Until 3GPP Rel-16 version, the RRC_INACTIVE state does not support transmitting data. When a User Equipment (UE) requires to transmit periodic or aperiodic infrequent small packets in the RRC_INACTIVE state, it needs to switch to RRC_CONNECTED state to resume connection first. Then after transmitting data, it switches back to the RRC_INACTIVE state. 3GPP RAN #86 plenary decided to carry out a work item of "small packet transmission in NR INACTIVE state" to study small packet transmission technology in the RRC_INACTIVE state, including transmitting uplink data in preconfigured Physical Uplink Shared Channel (PUSCH) resources, or carrying data with Message 3 (Msg3) or MsgB in Random Access (RA) procedure.

SUMMARY

In the current protocol version, when 2-Step RACH and 4-Step RACH are configured at the same time, a selection for RA_TYPE is based on RSRP criteria. When the RSRP reaches a certain threshold, the 2-Step RACH is selected, otherwise the 4-Step RACH is selected. Sizes of data that can be transmitted by Msg3 and MsgB are not necessarily the same, when small data transmission is performed in the RRC_INACTIVE state, only relying on RSRP to select RA_TYPE will reduce efficiency of transmitting small data. Therefore, it is necessary to enhance the selection of the RA_TYPE.

To address the above problem, the present disclosure provides a solution. In the statement above, the scenario of Terrestrial Network (TN) is taken as an example; the present disclosure is also applicable to other scenarios, such as Non-Terrestrial Network (NTN) transmission and V2X, where similar technical effects can be achieved. Additionally, the adoption of a unified solution for various scenarios contributes to the reduction of hardware complexity and costs.

It should be noted that if no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:
- receiving a first signaling; and
- generating a first data block in a first radio state; when a first condition set is satisfied, transmitting a first signal; and when the first condition set is not satisfied, transmitting a second signal;
- herein, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type Random Access (RA) procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, a problem to be solved in the present disclosure includes: each time the UE transmits data, it will go through the process of connection setup and release to the RRC_INACTIVE state, resulting in unnecessary power consumption and signaling overhead.

In one embodiment, a problem to be solved in the present disclosure includes: the current RA_TYPE selection criteria is single, and only depending on RSRP to select an RA_TYPE will lead to decrease in efficiency of transmitting small data.

In one embodiment, a problem to be solved in the present disclosure includes how to select an RA_TYPE according to a number of data.

In one embodiment, characteristics of the above method include determining an RA_TYPE according to a relation between the first data size and the first threshold.

In one embodiment, advantages of the above method include increasing a number of small packets transmitted in RRC_INACTIVE state.

In one embodiment, advantages of the above method include: it is more flexible to transmit small data through random access.

According to one aspect of the present disclosure, comprising:
- receiving a second signaling and a third signal;
- herein, the second signaling is used to determine a second threshold; a measurement performed on the third signal is used to determine a first receive quality; the first condition set comprises a size relation between the first receive quality and the second threshold.

According to one aspect of the present disclosure, it is characterized in that the first data size not being less than the first threshold is used to determine that the first condition set is satisfied; or the first data size not being less than the first threshold and the first receive quality not being less than the second threshold are used to determine that the first condition set is satisfied.

In one embodiment, the first data size not being less than the first threshold is used to determine that the first condition set is satisfied.

In one embodiment, the first data size not being less than the first threshold and the first receive quality not being less than the second threshold are used to determine that the first condition set is satisfied.

According to one aspect of the present disclosure, comprising:

in response to the second signal being transmitted, receiving a fourth signal; or, in response to the first signal being transmitted, receiving a fifth signal;

in response to the fifth signal being received, transmitting a sixth signal; and in response to the sixth signal being transmitted, receiving a seventh signal;

herein, the fourth signal is used to perform the first-type RA procedure, and the fourth signal comprises a second Random Access Response (RAR); the fifth signal, the sixth signal and the seventh signal are used to perform the first-type RA procedure, and the fifth signal comprises a first RAR; the second signal carries the first data block, or the sixth signal carries the first data block.

In one embodiment, in response to the second signal being transmitted, a fourth signal is received; the fourth signal is used to perform the first-type RA procedure, and the fourth signal comprises a second RAR; and the second signal carries the first data block.

In one embodiment, in response to the first signal being transmitted, a fifth signal is received; in response to the fifth signal being received, a sixth signal is transmitted; and in response to the sixth signal being transmitted, a seventh signal is received; the fifth signal, the sixth signal and the seventh signal are used to perform the first-type RA procedure, and the fifth signal comprises a first RAR; the sixth signal carries the first data block.

According to one aspect of the present disclosure, it is characterized in that a minimum value of a first buffer and a second buffer is used to determine the first threshold; the first buffer is used to determine a size of a buffer pool of the second signal, and the second buffer is used to determine a size of a buffer pool of the sixth signal.

According to one aspect of the present disclosure, wherein the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a Common Control Channel (CCCH).

According to one aspect of the present disclosure, wherein the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

The present disclosure provides a method in a second node for wireless communications, comprising:

transmitting a first signaling; and when the first condition set is satisfied, receiving a first signal; and when the first condition set is not satisfied, receiving a second signal;

herein, a first data block is generated in a first radio state; the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

According to one aspect of the present disclosure, comprising:

transmitting a second signaling and a third signal;

herein, the second signaling is used to determine a second threshold; a measurement performed on the third signal is used to determine a first receive quality; the first condition set comprises a size relation between the first receive quality and the second threshold.

According to one aspect of the present disclosure, it is characterized in that the first data size not being less than the first threshold is used to determine that the first condition set is satisfied; or the first data size not being less than the first threshold and the first receive quality not being less than the second threshold are used to determine that the first condition set is satisfied.

In one embodiment, the first data size not being less than the first threshold is used to determine that the first condition set is satisfied.

In one embodiment, the first data size not being less than the first threshold and the first receive quality not being less than the second threshold are used to determine that the first condition set is satisfied.

According to one aspect of the present disclosure, comprising:

in response to the second signal being received, transmitting a fourth signal; or, in response to the first signal being received, transmitting a fifth signal;

in response to the fifth signal being transmitted, receiving a sixth signal; and in response to the sixth signal being received, transmitting a seventh signal;

herein, the fourth signal is used to perform the first-type RA procedure, and the fourth signal comprises a second RAR; the fifth signal, the sixth signal and the seventh signal are used to perform the first-type RA procedure, and the fifth signal comprises a first RAR; the second signal carries the first data block, or the sixth signal carries the first data block.

In one embodiment, in response to the second signal being received, a fourth signal is transmitted; the fourth signal is used to perform the first-type RA procedure, and the fourth signal comprises a second RAR; and the second signal carries the first data block.

In one embodiment, in response to the first signal being received, a fifth signal is transmitted; in response to the fifth signal being transmitted, a sixth signal is received; and in response to the sixth signal being received, a seventh signal is transmitted; the fifth signal, the sixth signal and the seventh signal are used to perform the first-type RA procedure, and the fifth signal comprises a first RAR; and the sixth signal carries the first data block.

According to one aspect of the present disclosure, it is characterized in that a minimum value of a first buffer and a second buffer is used to determine the first threshold; the first buffer is used to determine a size of a buffer pool of the second signal, and the second buffer is used to determine a size of a buffer pool of the sixth signal.

According to one aspect of the present disclosure, wherein the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a CCCH.

According to one aspect of the present disclosure, wherein the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

The present disclosure provides a first node for wireless communications, comprising:

a first receiver, receiving a first signaling; and a first transmitter, generating a first data block in a first radio state; when a first condition set is satisfied, transmitting a first signal; and when the first condition set is not satisfied, transmitting a second signal;

herein, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

The present disclosure provides a second node for wireless communications, comprising:

a second transmitter, transmitting a first signaling; and a second receiver, when the first condition set is satisfied, receiving a first signal; when the first condition set is not satisfied, receiving a second signal;

herein, a first data block is generated in a first radio state; the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the present disclosure has the following advantages over conventional schemes:

small packet transmission of UE in the RRC_INACTIVE state is ensured;

a number of small packets transmitted in the RRC_INACTIVE state is increased;

the flexibility of RA_TYPE selection is improved;

the size of small packets transmitted through RA is more flexible.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
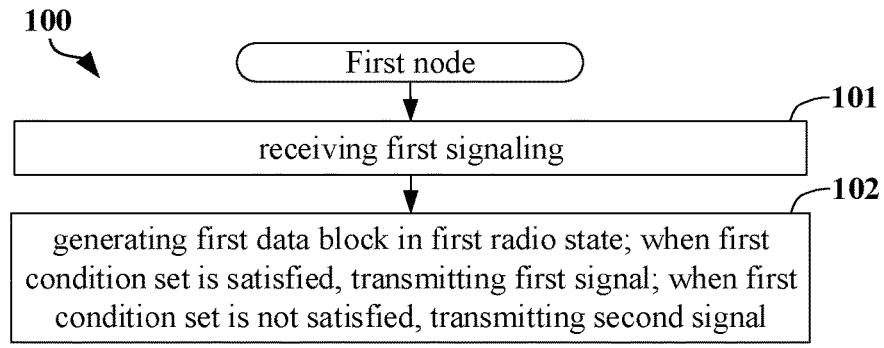
FIG. 1 illustrates a flowchart of transmission of a first signaling, a first signal and a second signal according to one embodiment of the present disclosure.

Embodiment 1 illustrates a flowchart of transmission of a first signaling, a first signal and a second signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure receives a first signaling in step 101; generates a first data block in a first radio state in step 102; when a first condition set is satisfied, transmits a first signal; and when the first condition set is not satisfied, transmits a second signal; herein, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the first signaling is transmitted via an air interface.

In one embodiment, the first signaling is transmitted via an antenna port.

In one embodiment, the first signaling comprises a downlink signal.

In one embodiment, the first signaling comprises a sidelink signal.

In one embodiment, the first signaling comprises all or part of a high-layer signaling.

In one embodiment, the first signaling comprises all or part of a higher-layer signaling.

In one embodiment, the first signaling comprises an RRC message.

In one embodiment, the first signaling comprises all or partial IEs in an RRC Message.

In one embodiment, the first signaling comprises all or partial fields of an IE in an RRC Message.

In one embodiment, the first signaling comprises a System Information Block1 (SIB1).

In one embodiment, the first signaling comprises an UplinkConfigCommon IE.

In one embodiment, the first signaling comprises an UplinkConfigCommonSIB IE.

In one embodiment, the first signaling comprises a BWP-Uplink IE.

In one embodiment, the first signaling comprises a BWP-UplinkCommon IE.

In one embodiment, the first signaling comprises a CellGroupConfig IE.

In one embodiment, the first signaling comprises a RACH-ConfigCommon IE.

In one embodiment, the first signaling comprises a RACH-ConfigCommonTwoStepRA IE.

In one embodiment, the first signaling comprises a RACH-ConfigDedicated IE.

In one embodiment, the first signaling comprises a RACH-ConfigGenericTwoStepRA IE.

In one embodiment, the first signaling comprises a RACH-ConfigGeneric IE.

In one embodiment, the first signaling comprises an SI-SchedulingInfo IE.

In one embodiment, the first signaling comprises a PRACH-Config IE.

In one embodiment, the first signaling comprises a RACH-ConfigCommon IE.

In one embodiment, the first signaling comprises a RACH-ConfigDedicated IE.

In one embodiment, the first signaling comprises a RadioResourceConfigCommon IE.

In one embodiment, the phrase of the first signaling being used to determine a first threshold includes: the first signaling comprises the first threshold.

In one embodiment, the phrase of the first signaling being used to determine a first threshold includes: the first threshold is obtained by the first signaling.

In one embodiment, the phrase of the first signaling being used to determine a first threshold includes: the first threshold is explicitly configured by the first signaling.

In one subembodiment of the embodiment, the first signaling indicates the first threshold.

In one subembodiment of the embodiment, the first threshold is a field in the first signaling.

In one embodiment, the phrase that the first signaling is used to determine a first threshold includes: the first threshold is implicitly configured by the first signaling.

In one subembodiment of the embodiment, the first threshold is inferred by a parameter in the first signaling.

In one subembodiment of the embodiment, the first signaling does not configure the first threshold directly.

In one embodiment, the phrase of the first threshold being a positive integer includes: a value of the first threshold is an integer greater than 0.

In one embodiment, the phrase of the first threshold being a positive integer includes: a value of the first threshold does not comprise a decimal part.

In one embodiment, the first threshold comprises a msgA-DataSize-Threshold field.

In one embodiment, the first threshold comprises a msgA-DataSize-ThresholdSUL field.

In one embodiment, the first threshold comprises a msgA-MsgASize-Threshold field.

In one embodiment, the first threshold comprises a msgA-MsgASize-ThresholdSUL field.

In one embodiment, the first threshold comprises a msgA-Msg3 Size-Threshold field.

In one embodiment, the first threshold comprises a msgA-Msg3Size-ThresholdSUL field.

In one embodiment, the first threshold comprises a msgA-MsgSize-Threshold field.

In one embodiment, the first threshold comprises a msgA-MsgSize-ThresholdSUL field.

In one embodiment, the first threshold comprises a msgA-PayloadSize-Threshold field.

In one embodiment, the first threshold comprises a msgA-PayloadSize-ThresholdSUL field.

In one embodiment, the first threshold comprises a msgA-SmalldataSize-Threshold field.

In one embodiment, the first threshold comprises a msgA-SmalldataSize-ThresholdSUL field.

In one embodiment, the first threshold is used to determine selecting an RA_TYPE.

In one embodiment, the first threshold is used to determine whether a selected RA_TYPE belongs to the first-type RA or the second-type RA.

In one embodiment, the first threshold is used to determine selecting a 2-Step RACH or a 4-Step RACH.

In one embodiment, the first threshold is used to determine an Early Data Transmission (EDT).

In one embodiment, the first threshold is used to determine selecting Small Data Transmission (SDT).

In one embodiment, the phrase of generating a first data block in a first radio state includes: when the first node is in the first radio state, the first date block reaches.

In one embodiment, the phrase of generating a first data block in a first radio state includes: when the first node is in the first radio state, the first date block is generated.

In one embodiment, the phrase of generating a first data block in a first radio state includes: when the first node is in the first radio state, the first date block is to be transmitted.

In one embodiment, the phrase of the first data block comprising more than one bit includes: a size of the first data block comprises at least one bit.

In one embodiment, the phrase of the first data block comprising more than one bit includes: the first data block occupies at least one information bit.

In one embodiment, the phrase of the first data block comprising more than one bit includes: the first data block is transmitted through at least one information bit.

In one embodiment, the phrase of the first radio state comprising an RRC state includes: the first radio state is an CM state.

In one embodiment, the phrase of the first radio state comprising an RRC state includes:

the first radio state is an RRC_CONNECTED state.

In one embodiment, the first radio state comprises an CM-Connected state.

In one embodiment, the first radio state comprises an CM-Idle state.

In one embodiment, the first radio state comprises an CM-Inactive state.

In one embodiment, the first radio state comprises an RRC_CONNECTED state.

In one embodiment, the first radio state comprises an RRC_INACTIVE state.

In one embodiment, the first radio state comprises an RRC IDLE state.

In one embodiment, the first data block is generated by a Medium Access Control (MAC) layer.

In one embodiment, the first data block is generated by an RRC layer.

In one embodiment, the first data block is generated by a Physical (PHY) layer.

In one embodiment, the first date block is generated by a higher layer.

In one embodiment, the first data block comprises a MAC subhead.

In one embodiment, the first data block does not comprise a MAC subhead.

In one embodiment, the first data block comprises a size of a CCCH.

In one embodiment, the first data block comprises a MAC Control Element (CE).

In one embodiment, the first data block comprises a MAC Protocol Data Unit (PDU).

In one embodiment, the first data block comprises a MAC Service Data Unit (SDU).

In one embodiment, the first data block comprises a Transmission Block Size (TBS).

In one embodiment, the first data block comprises a small packet.

In one embodiment, the first data block comprises a data block on the PHY.

In one embodiment, the first data block supports segmentation.

In one embodiment, the first data block does not support segmentation.

In one embodiment, the first condition set is used to determine an RA_TYPE.

In one subembodiment of the above embodiment, the RA_TYPE comprises the first-type RA.

In one subembodiment of the above embodiment, the RA_TYPE comprises the second-type RA.

In one embodiment, the first-type RA procedure comprises a 2-Step RACH.

In one embodiment, the first-type RA procedure comprises a 4-Step RACH.

In one embodiment, the second-type RA procedure comprises a 2-Step RACH.

In one embodiment, the second-type RA procedure comprises a 4-Step RACH.

In one embodiment, the phrase of "when a first condition set is satisfied, transmitting a first signal; when the first condition set is not satisfied, transmitting a second signal" includes: whether the first condition set is satisfied is used to determine transmitting the first signal or transmitting the second signal.

In one embodiment, the phrase of "when a first condition set is satisfied, transmitting a first signal; when the first condition set is not satisfied, transmitting a second signal" includes: transmitting the first signal or transmitting the second signal is related to the first condition set.

In one embodiment, the phrase of "when a first condition set is satisfied, transmitting a first signal; when the first condition set is not satisfied, transmitting a second signal" includes: when the first condition set is satisfied, initiating the first-type RA procedure; when the first condition set is not satisfied, initiating the second-type RA procedure.

In one embodiment, the phrase of "when a first condition set is satisfied, transmitting a first signal; when the first condition set is not satisfied, transmitting a second signal" includes: when a first condition set is satisfied, selecting the first-type RA, and setting the RA_TYPE as the first-type RA; when the first condition set is not satisfied, selecting the second-type RA, and setting the RA_TYPE as the second-type RA.

In one embodiment, the phrase of the first signal being used for a first-type RA procedure includes: the first signal is used to initiate the first-type RA procedure.

In one embodiment, the phrase of the first signal being used for a first-type RA procedure includes: the first signal comprises a first signal in the first-type RA procedure.

In one embodiment, the phrase of the first signal being used for a first-type RA procedure includes: the first signal is used to determine performing the first-type RA procedure.

In one embodiment, the phrase of the first signal being used for a first-type RA procedure includes: the first signal is used to be associated with the first-type RA procedure.

In one embodiment, the phrase of the first signal being used for a first-type RA procedure includes: the base station judges that the RA_TYPE is the first-type RA procedure through the first signal.

In one embodiment, the phrase of the first signal being used for a first-type RA includes: the first signal is specific to the first-type RA procedure.

In one embodiment, the phrase of the second signal being used for a second-type RA procedure includes: the second signal is used to initiate the second-type RA procedure.

In one embodiment, the phrase of the second signal being used for a second-type RA procedure includes: the second signal comprises a first signal in the second-type RA procedure.

In one embodiment, the phrase of the second signal being used for a second-type RA procedure includes: the second signal is used to determine performing the second-type RA procedure.

In one embodiment, the phrase of the second signal being used for a second-type RA procedure includes: the second signal is used to be associated with the second-type RA procedure.

In one embodiment, the phrase of the second signal being used for a second-type RA procedure includes: the base station judges that the RA_TYPE is the second-type RA procedure through the second signal.

In one embodiment, the phrase of the second signal being used for a second-type RA procedure includes: the second signal is specific to the second-type RA procedure.

In one embodiment, the phrase of the first-type RA procedure being different from the second-type RA procedure includes: the first-type RA procedure and the second-type RA procedure belong to different RA procedures.

In one embodiment, the phrase of the first-type RA procedure being different from the second-type RA procedure includes: the first-type RA procedure comprises a 4-Step RACH procedure, and the second-type RA procedure comprises a 2-Step RACH procedure.

In one embodiment, the phrase of the first-type RA procedure being different from the second-type RA procedure includes: the first-type RA procedure comprises a 2-Step RACH procedure, and the second-type RA procedure comprises a 4-Step RACH procedure.

In one embodiment, the phrase of the first-type RA procedure being different from the second-type RA procedure includes: a number of steps in the first-type RA procedure is different from a number of steps in the second-type RA procedure.

In one embodiment, the phrase of the first-type RA procedure being different from the second-type RA procedure includes: the purpose of the RA in the first-type RA procedure is different from the purpose of the RA in the second-type RA procedure.

In one subembodiment of the above embodiment, the purpose of the RA comprises an EDT.

In one subembodiment of the above embodiment, the purpose of the RA comprises an SDT.

In one subembodiment of the above embodiment, the purpose of the RA comprises switching from an RRC idle state or an RRC inactive state to an RRC connected state.

In one subembodiment of the above embodiment, the purpose of the RA comprises switching to a target cell.

In one subembodiment of the above embodiment, the purpose of the RA comprises an uplink synchronization.

In one embodiment, the phrase of the first signal carrying a first sequence includes: the first signal is associated with the first sequence.

In one embodiment, the phrase of the first signal carrying a first sequence includes: the first signal comprises the first sequence.

In one embodiment, the phrase of the first signal carrying a first sequence includes: the first signal is the first sequence.

In one embodiment, the phrase of the first signal carrying a first sequence includes: the first signal is transmitted in time-frequency resource corresponding to the first sequence.

In one embodiment, the phrase of the first signal carrying a first sequence includes: the first signal is generated by the first sequence.

In one embodiment, the phrase of the first signal carrying a first sequence includes: the first sequence is transmitted through the first signal.

In one embodiment, the first sequence comprises a preamble sequence of the first-type RA.

In one embodiment, the second sequence comprises a preamble sequence of the second-type RA.

In one embodiment, the phrase of the second signal carrying a second sequence includes: the second signal is associated with the second sequence.

In one embodiment, the phrase of the second signal carrying a second sequence includes: the second signal comprises the second sequence.

In one embodiment, the phrase of the second signal carrying a second sequence includes: the second signal is the second sequence.

In one embodiment, the phrase of the second signal carrying a second sequence includes: the second signal is transmitted in time-frequency resources corresponding to the second sequence.

In one embodiment, the phrase of the second signal carrying a second sequence includes: the second signal is generated by the second sequence.

In one embodiment, the phrase of the second signal carrying a second sequence includes: the second sequence is transmitted through the second signal.

In one embodiment, the phrase of the first sequence being different from the second sequence includes: the first sequence and the second sequence are associated with different the RA_TYPEs.

In one embodiment, the phrase of the first sequence being different from the second sequence includes: the first sequence and the second sequence are associated with different RA preamble groups.

In one embodiment, the phrase of the first sequence being different from the second sequence includes: a length of the first sequence is different from the a length of the second sequence.

In one embodiment, the phrase of the first sequence being different from the second sequence includes: the first sequence is different from the second sequence.

In one embodiment, the phrase of the first sequence being different from the second sequence includes: the first sequence and the second sequence are associated with different time-frequency resources.

In one embodiment, the first signal is used for initiating an RA procedure.

In one embodiment, the first signal is used for initiating a 4-Step RACH.

In one embodiment, the first signal is used for initiating a 2-Step RACH.

In one embodiment, the first signal is transmitted via an air interface.

In one embodiment, the first signal is transmitted via an antenna port.

In one embodiment, the first signal is transmitted via a Uu interface.

In one embodiment, the first signal is transmitted via a sidelink.

In one embodiment, the first signal is transmitted on a CCCH.

In one embodiment, the first signal is transmitted on a Dedicated Transmission Channel (DTCH).

In one embodiment, the first signal is transmitted on a Random Access Channel (RACH).

In one embodiment, the first signal is transmitted on a Physical Random Access Channel (PRACH).

In one embodiment, the first signal is transmitted on a Narrowband Physical Random Access Channel (NPRACH).

In one embodiment, the first signal is transmitted on an Uplink Shared Channel (UL-SCH).

In one embodiment, the first signal is transmitted on a Physical Uplink Shared Channel (PUSCH).

In one embodiment, the first signal is transmitted on a Physical Uplink Control Channel (PUCCH).

In one embodiment, the first signal is transmitted on a Physical Sidelink Shared Channel (PSSCH).

In one embodiment, the first signal is transmitted on a Physical Sidelink Control Channel (PSCCH).

In one embodiment, the first signal is transmitted on a PUCCH and a PUSCH.

In one embodiment, the first signal is transmitted on a PSCCH and a PSSCH.

In one embodiment, the first signal comprises an uplink signal.

In one embodiment, the first signal comprises a sidelink signal.

In one embodiment, the first signal comprises a baseband signal.

In one embodiment, the first signal comprises all or part of a Physical Layer signal.

In one embodiment, the first signal comprises a PRACH.

In one embodiment, the first signal comprises an NPRACH.

In one embodiment, the first signal comprises all or part of a MAC signaling.

In one embodiment, the first signal comprises all or partial fields in a MAC CE.

In one embodiment, the first signal comprises all or partial fields of a MAC subheader.

In one embodiment, the first signal comprises all or partial fields in a MAC PDU.

In one embodiment, the first signal comprises a Cell Radio Network Temporary Identifier (C-RNTI) MAC CE.

In one embodiment, the first signal comprises a CCCH SDU.

In one embodiment, the first signal comprises all or part of a high-layer signaling.

In one embodiment, the first signal comprises all or part of a higher-layer signaling.

In one embodiment, the first signal comprises all or partial IEs of an RRC message.

In one embodiment, the first signal comprises all or partial fields in an IE in an RRC message.

In one embodiment, the first signal comprises all of Msg 1.

In one embodiment, the first signal comprises part of Msg 1.

In one embodiment, the first signal comprises Msg 1, and the Msg 1 comprises the first sequence.

In one subembodiment of the above embodiment, the first sequence comprises a preamble sequence.

In one subembodiment of the above embodiment, the preamble sequence comprises a bit string.

In one subembodiment of the above embodiment, the preamble sequence comprises a sequence.

In one subembodiment of the above embodiment, the preamble sequence comprises a ZC sequence.

In one subembodiment of the above embodiment, the preamble sequence comprises a Gold sequence.

In one subembodiment of the above embodiment, the preamble sequence comprises a preamble.

In one subembodiment of the above embodiment, the preamble sequence comprises a PRACH signal.

In one subembodiment of the above embodiment, the preamble sequence comprises an NPRACH signal.

In one embodiment, the first signal comprises all of Msg A.

In one embodiment, the first signal comprises part of Msg A.

In one embodiment, the first signal comprises MsgA, and the MsgA comprises the first sequence.

In one subembodiment of the embodiment, the first sequence comprises the preamble sequence.

In one subembodiment of the above embodiment, the Msg A comprises the Msg 1.

In one embodiment, the first signal comprises MsgA, and the MsgA comprises a payload.

In one subembodiment of the embodiment, the payload comprises a PUSCH.

In one subembodiment of the embodiment, the payload comprises MAC information.

In one subembodiment of the embodiment, the payload comprises RRC information.

In one subembodiment of the embodiment, the payload comprises one of an RRCResumeRequest1 message, an RRCResumeRequest message or an RRCConnectionResumeRequest message.

In one subembodiment of the embodiment, the payload comprises an RRCConnectionReestablishmentRequest message or an RRCReestablishmentRequest message.

In one subembodiment of the embodiment, the payload comprises an RRCSetupRequest or an RRCConnectionSetupRequest.

In one subembodiment of the embodiment, the payload comprises an RRCConnectionRequest message.

In one subembodiment of the embodiment, the payload comprises an RRCEarlyDataRequest message.

In one subembodiment of the embodiment, the payload comprises an RRCSmallDataRequest message.

In one subembodiment of the embodiment, the payload comprises a UE identifier.

In one subembodiment of the embodiment, the payload comprises a C-RNTI.

In one subembodiment of the embodiment, the payload comprises a Buffer Status Report (BSR).

In one subembodiment of the embodiment, the payload comprises a Resume ID.

In one subembodiment of the embodiment, the payload comprises an I-RNTI.

In one subembodiment of the embodiment, the payload comprises an indicator of data size.

In one subembodiment of the embodiment, the payload comprises an NAS UE identifier.

In one embodiment, the first signal comprises Msg 1 and Msg 3.

In one embodiment, the second signal is used for initiating an RA procedure.

In one embodiment, the second signal is used for initiating a 4-Step RACH.

In one embodiment, the second signal is used for initiating a 2-Step RACH.

In one embodiment, the second signal is transmitted via an air interface.

In one embodiment, the second signal is transmitted via an antenna port.

In one embodiment, the second signal is transmitted via a Uu interface.

In one embodiment, the second signal is transmitted via a sidelink.

In one embodiment, the second signal is transmitted on a CCCH.

In one embodiment, the second signal is transmitted on a DTCH.

In one embodiment, the second signal is transmitted on a RACH.

In one embodiment, the second signal is transmitted on a PRACH.

In one embodiment, the second signal is transmitted on an NPRACH.

In one embodiment, the second signal is transmitted on a UL-SCH.

In one embodiment, the second signal is transmitted on a PUSCH.

In one embodiment, the second signal is transmitted on a PUCCH.

In one embodiment, the second signal is transmitted on a PSSCH.

In one embodiment, the second signal is transmitted on a PSCCH.

In one embodiment, the second signal is transmitted on a PUCCH and a PUSCH.

In one embodiment, the second signal is transmitted on a PSCCH and a PSSCH.

In one embodiment, the second signal comprises an uplink signal.

In one embodiment, the second signal comprises a sidelink signal.

In one embodiment, the second signal comprises a baseband signal.

In one embodiment, the second signal comprises all or part of a Physical Layer signal.

In one embodiment, the second signal comprises a PRACH.

In one embodiment, the second signal comprises an NPRACH.

In one embodiment, the second signal comprises all or part of a MAC signaling.

In one embodiment, the second signal comprises all or partial fields in a MAC CE.

In one embodiment, the second signal comprises all or partial fields in a MAC subheader.

In one embodiment, the second signal comprises all or partial fields in a MAC PDU.

In one embodiment, the second signal comprises a C-RNTI MAC CE.

In one embodiment, the second signal comprises a CCCH SDU.

In one embodiment, the second signal comprises all or part of a high-layer signaling.

In one embodiment, the second signal comprises all or part of a higher-layer signaling.

In one embodiment, the second signal comprises all or partial IEs in an RRC message.

In one embodiment, the second signal comprises all or partial fields in an IE of an RRC message.

In one embodiment, the second signal comprises all of Msg 1.

In one embodiment, the second signal comprises part of Msg 1.

In one embodiment, the second signal comprises Msg 1, and the Msg 1 comprises the second sequence.

In one subembodiment of the embodiment, the second sequence comprises the preamble sequence.

In one embodiment, the second signal comprises all of Msg A.

In one embodiment, the second signal comprises part of Msg A.

In one embodiment, the second signal comprises Msg A, and the Msg A comprises the second sequence.

In one subembodiment of the embodiment, the second sequence comprises the preamble sequence.

In one subembodiment of the above embodiment, the Msg A comprises the Msg 1.

In one embodiment, the second signal comprises Msg A, and the Msg A comprises the payload.

In one embodiment, the second signal comprises Msg 1 and Msg 3.

In one embodiment, the phrase of the first condition set comprising a size relation between a first data size and the first threshold includes: a size relation between the first data size and the first threshold is used to determine whether the first condition set is satisfied.

In one embodiment, the phrase of the first condition set comprising a size relation between a first data size and the first threshold includes: the first condition set is related to a size relation between the first data size and the first threshold.

In one embodiment, the phrase of a size relation between a first data size and the first threshold includes: the first data size is greater than the first threshold.

In one embodiment, the phrase of a size relation between a first data size and the first threshold includes: the first data size is not less than the first threshold.

In one embodiment, the phrase of a size relation between a first data size and the first threshold includes: the first data size is less than the first threshold.

In one embodiment, the phrase of a size relation between a first data size and the first threshold includes: the first data size is not greater than the first threshold.

In one embodiment, the phrase of a size relation between a first data size and the first threshold includes: the first data size is equal to the first threshold.

In one embodiment, the phrase of the first data size being equal to a number of bits comprised in the first data block includes: the first data size is equal to a size of the first data block.

In one embodiment, the phrase of the first data size being equal to a number of bits comprised in the first data block includes: the first data size comprises a size of the first data block.

In one embodiment, the phrase of the first data size being equal to a number of bits comprised in the first data block includes: the first data size is equal to a number of bits occupied by the first data block.

In one embodiment, the first condition set comprises a selection criteria of the RA_TYPE.

In one embodiment, the first condition set is used to determine selecting the first-type RA procedure or selecting the second-type RA procedure.

In one embodiment, the first data size comprises a positive integer,

In one embodiment, the first data size comprises at least one information bit.

In one embodiment, a unit of measurement of the first data size includes bit.

In one embodiment, a unit of measurement of the first data size includes byte.

Embodiment 2

Figure 2:
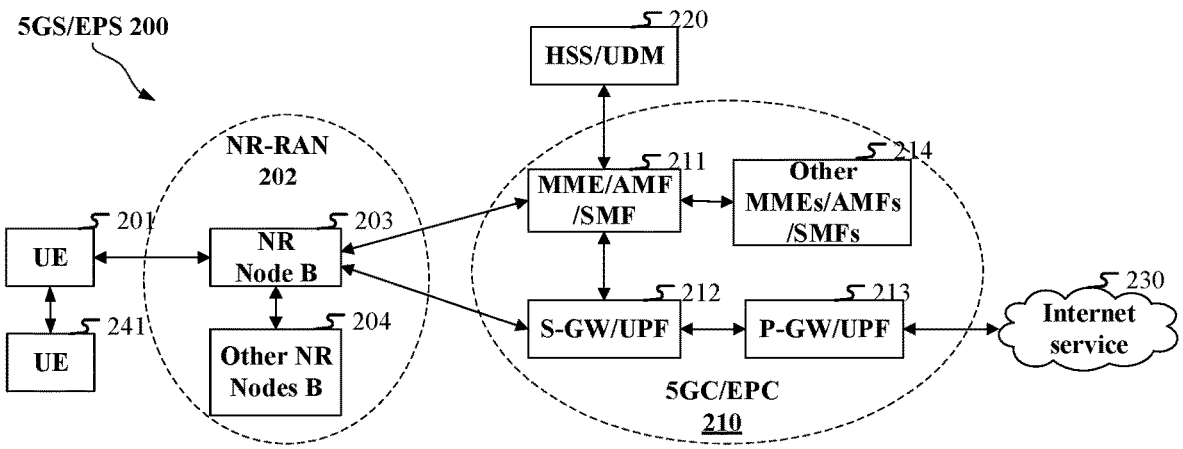
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports NTN transmission.

In one embodiment, the UE 201 supports transmission within networks with large delay differences.

In one embodiment, the UE 201 supports Terrestrial Networks (TN) transmission.

In one embodiment, the UE 201 is a UE.

In one embodiment, the UE 201 is an aircraft.

In one embodiment, the UE 201 is a vehicle terminal.

In one embodiment, the UE 201 is a relay.

In one embodiment, the UE 201 is a vessel.

In one embodiment, the UE 201 is a IoT terminal.

In one embodiment, the UE 201 is an Industrial IoT terminal.

In one embodiment, the UE 201 is a device that supports transmission with low-latency and high-reliability.

In one embodiment, the gNB 203 corresponds to the second node in the present disclosure.

In one embodiment, the gNB 203 supports transmission within NTN.

In one embodiment, the gNB 203 supports transmission within networks with large delay differences.

In one embodiment, the gNB 203 supports transmission within TN.

In one embodiment, the gNB 203 is a Marco Cellular base station.

In one embodiment, the gNB203 is a Micro Cell base station.

In one embodiment, the gNB 203 is a Pico Cell base station.

In one embodiment, the gNB203 is a Femtocell.

In one embodiment, the gNB203 is a base station that supports large delay differences.

In one embodiment, the gNB203 is a flight platform.

In one embodiment, the gNB203 is satellite equipment.

In one embodiment, the gNB203 is a UE.

In one embodiment, the gNB203 is a gateway.

Embodiment 3

Figure 3:
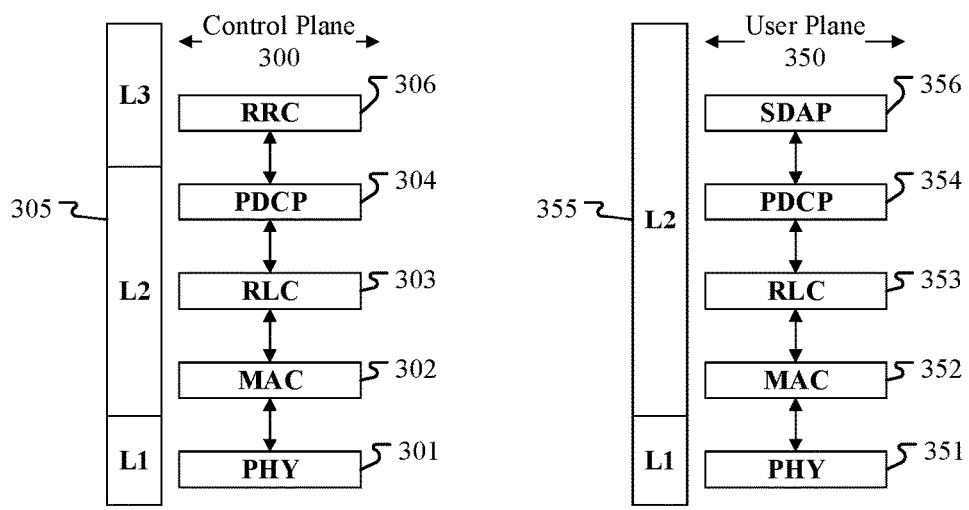
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present disclosure. L2 305, above the PHY 301, comprises a MAC sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the RRC 306.

In one embodiment, the first signaling in the present disclosure is generated by the MAC 302 or the MAC 352.

In one embodiment, the second signaling in the present disclosure is generated by the RRC 306.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second signal in the present disclosure is generated by the RRC 306.

In one embodiment, the second signal in the present disclosure is generated by the MAC 302 or the MAC 352.

In one embodiment, the second signal in the present disclosure is generated by the PHY 301 or the PHY 351.

In one embodiment, the third signal in the present disclosure is generated by the RRC 306.

In one embodiment, the fourth signal in the present disclosure is generated by the RRC 306.

In one embodiment, the fourth signal in the present disclosure is generated by the MAC 302 or the MAC 352.

In one embodiment, the fourth signal in the present disclosure is generated by the PHY 301 or the PHY 351.

In one embodiment, the fifth signal in the present disclosure is generated by the MAC 302 or the MAC 352.

In one embodiment, the sixth signal in the present disclosure is generated by the RRC 306.

In one embodiment, the sixth signal in the present disclosure is generated by the MAC 302 or the MAC 352.

In one embodiment, the seventh signal in the present disclosure is generated by the RRC 306.

In one embodiment, the seventh signal in the present disclosure is generated by the MAC 302 or the MAC 352.

In one embodiment, the meanings of signal, signaling and message in the present disclosure are the same.

In one embodiment, the meanings of signal, signaling and message in the present disclosure are different.

Embodiment 4

Figure 4:
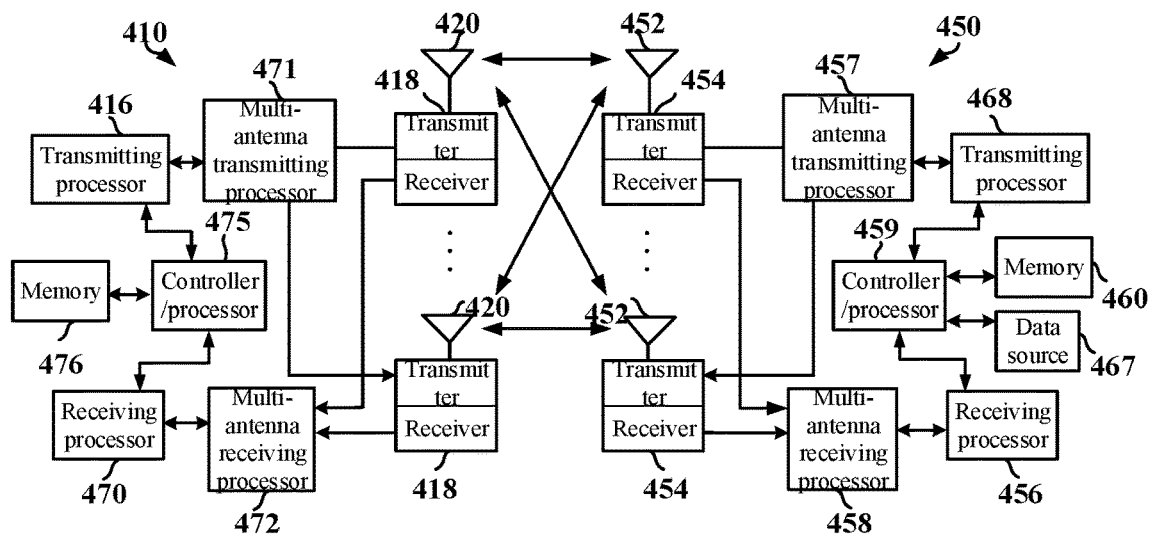
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least receives a first signaling; generates a first data block in a first radio state; when a first condition set is satisfied, transmits a first signal; and when the first condition set is not satisfied, transmits a second signal; herein, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the first communication device 450 comprises at least one processor and at least one memory. a memory that stores a computer readable instruction program. The computer readable instruction program generates an action when executed by at least one processor. The action includes: receiving a first signaling; generating a first data block in a first radio state; when a first condition set is satisfied, transmitting a first signal; and when the first condition set is not satisfied, transmitting a second signal; herein, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling; and when the first condition set is satisfied, receives a first signal; and when the first condition set is not satisfied, receives a second signal; herein, a first data block is generated in a first radio state; the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the second communication device 410 comprises a memory that stores a computer readable instruction program. The computer readable instruction program generates an action when executed by at least one processor. The action includes: transmitting a first signaling; and when the first condition set is satisfied, receiving a first signal; and when the first condition set is not satisfied, receiving a second signal; herein, a first data block is generated in a first radio state; the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the antenna 452, the receiver 454, the receiving processor 456, the controller/processor 459 are used to receive the first signaling; at least one of the antenna 420, the transmitter 418, the transmitting processor 416, or the controller/processor 475 is used to transmit the first signaling.

In one embodiment, the antenna 452, the transmitter 454, the transmitting processor 468, and the controller/processor 459 are used to transmit the first signal; at least one of the antenna 420, the receiver 418, the receiving processor 470, or the controller/processor 475 is used to receive the first signal.

In one embodiment, the antenna 452, the transmitter 454, the transmitting processor 468, and the controller/processor 459 are used to transmit a second signal; at least one of the antenna 420, the receiver 418, the receiving processor 470, or the controller/processor 475 is used to receive a second signal.

In one embodiment, the antenna 452, the receiver 454, the receiving processor 456, the controller/processor 459 are used to receive the second signaling; at least one of the antenna 420, the transmitter 418, the transmitting processor 416, or the controller/processor 475 is used to transmit the second signaling.

In one embodiment, the antenna 452, the receiver 454, the receiving processor 456, the controller/processor 459 are used to receive the third signal; at least one of the antenna 420, the transmitter 418, the transmitting processor 416, or the controller/processor 475 is used to transmit the third signal.

In one embodiment, the antenna 452, the receiver 454, the receiving processor 456, the controller/processor 459 are used to receive the fourth signal; at least one of the antenna 420, the transmitter 418, the transmitting processor 416, or the controller/processor 475 is used to transmit the fourth signal.

In one embodiment, the antenna 452, the receiver 454, the receiving processor 456, the controller/processor 459 are used to receive the fifth signal; at least one of the antenna 420, the transmitter 418, the transmitting processor 416, or the controller/processor 475 is used to transmit the fifth signal.

In one embodiment, the antenna 452, the transmitter 454, the transmitting processor 468, and the controller/processor 459 are used to transmit the sixth signal; at least one of the antenna 420, the receiver 418, the receiving processor 470, or the controller/processor 475 is used to receive the sixth signal.

In one embodiment, the antenna 452, the receiver 454, the receiving processor 456, the controller/processor 459 are used to receive the seventh signal; at least one of the antenna 420, the transmitter 418, the transmitting processor 416, or the controller/processor 475 is used to transmit the seventh signal.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a UE that supports large delay differences.

In one embodiment, the first communication device 450 is a UE that supports NTN.

In one embodiment, the first communication device 450 is an aircraft device.

In one embodiment, the first communication device 450 has a positioning capability.

In one embodiment, the first communication device 450 does not have a positioning capability.

In one embodiment, the first communication device 450 is a UE that supports TN.

In one embodiment, the second communication device 410 is a base station (gNB/eNB/ng-eNB).

In one embodiment, the second communication device 410 is a base station that supports large delay differences.

In one embodiment, the second communication device 410 is a base station that supports NTN.

In one embodiment, the second communication device 410 is a satellite equipment.

In one embodiment, the second communication device 410 is flying platform equipment.

In one embodiment, the second communication device 410 is a base station that supports TN.

Embodiment 5

Figure 5:
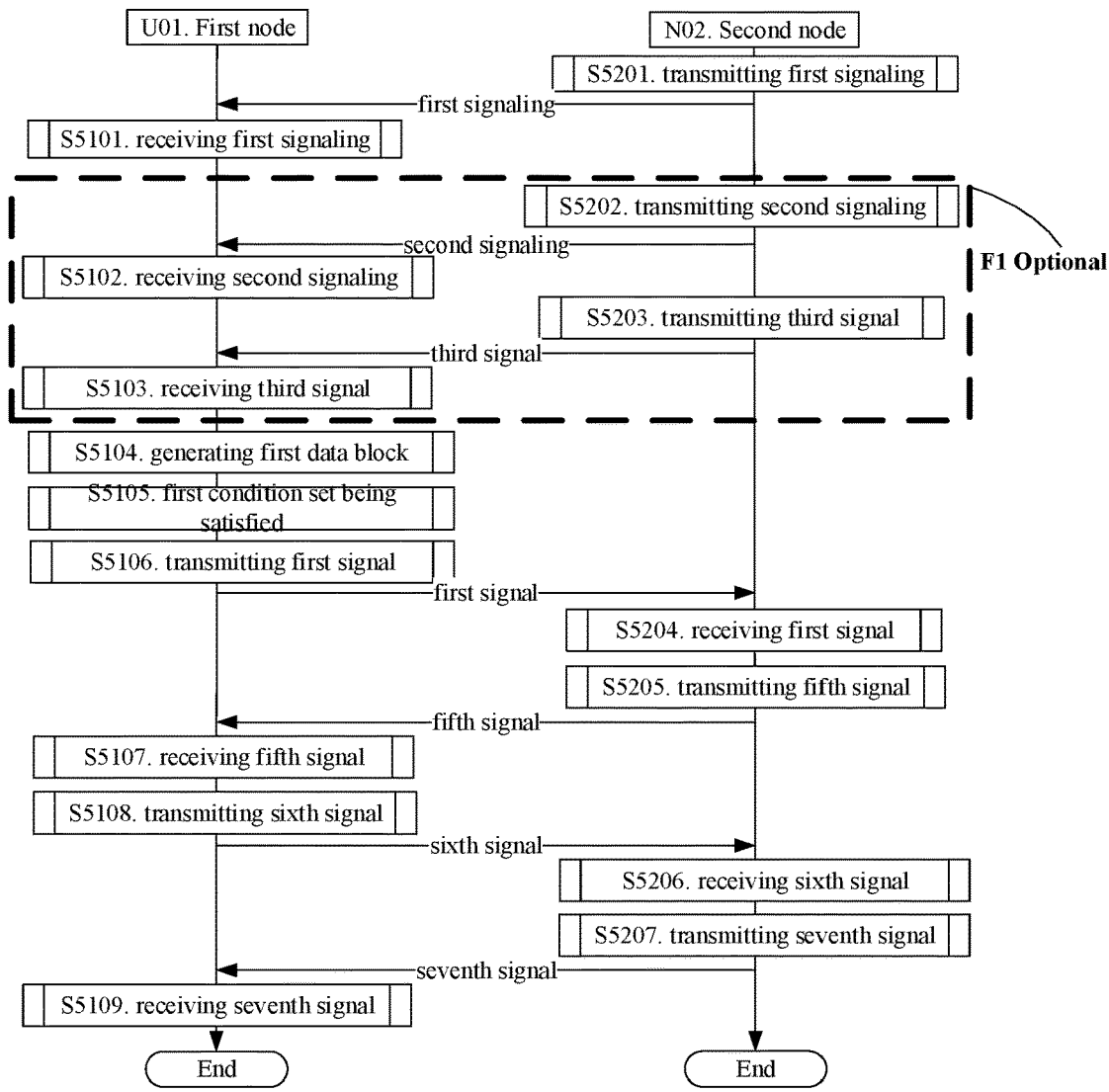
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. It is particularly underlined that the order illustrated in the embodiment does not put constraints over sequences of signal transmissions and implementations.

The first node U01 receives a first signaling in step S5101; receives a second signaling in step S5102; receives a third signaling in step S5103; generates a first data block in a first radio state in step S5104; a first condition set is satisfied in step S5105; when the first condition set is satisfied, transmits a first signal in step S5106; in response to the first signal being transmitted, receives a fifth signal in step S5107; in response to the fifth signal being received, transmits a sixth signal in step S5108; and in response to the sixth signal being transmitted, receives a seventh signal in step S5109.

The second node N02 transmits a first signaling in step S5201; transmits a second signaling in step S5202; transmits a third signal in step S5203; receives a first signal in step S5204; transmits a fifth signal in step S5205; receives a sixth signal in step S5206; and transmits a seventh signal in step S5207.

In Embodiment 5, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure; the first signal carries a first sequence; the first radio state comprises an RRC state; the second signaling is used to determine a second threshold; a measurement performed on the third signal is used to determine a first receive quality; the fifth signal, the sixth signal and the seventh signal are used to perform the first-type RA procedure, and the fifth signal comprises a first RAR; the sixth signal carries the first data block.

In Embodiment 5, the first signaling is used to determine a first threshold, the first threshold is a positive integer; the first condition set comprises a size relation between a first data size and the first threshold; the first condition set comprises a size relation between the first receive quality and the second threshold; the first data block comprises more than one bit, and the first data size is equal to a number of bits comprised in the first data block; the first signal is used for a first-type RA procedure; the first signal carries a first sequence; the first radio state comprises an RRC state; the second signaling is used to determine a second threshold; a measurement performed on the third signal is used to determine a first receive quality; the fifth signal, the sixth signal and the seventh signal are used to perform the first-type RA procedure, and the fifth signal comprises a first RAR; and the sixth signal carries the first data block.

In one embodiment, the first node U01 comprises a UE.

In one embodiment, the first node U01 comprises an ender.

In one embodiment, the second node N02 comprises a base station.

In one embodiment, the second node N02 comprises an ender.

In one embodiment, the phrase of in response to the first signal being transmitted includes a subsequent action after the first signal is transmitted.

In one embodiment, the phrase of in response to the first signal being transmitted includes when the first signal is transmitted.

In one embodiment, the phrase of in response to the fifth signal being received includes a subsequent action after the fifth signal is received.

In one embodiment, the phrase of in response to the fifth signal being received includes when the fifth signal is received.

In one embodiment, the phrase of in response to the sixth signal being transmitted includes a subsequent action after the sixth signal is transmitted.

In one embodiment, the phrase of in response to the sixth signal being transmitted includes when the sixth signal is transmitted.

In one embodiment, the first condition set comprises K1 condition(s), K1 being a positive integer.

In one subembodiment of the above embodiment, the K1 is equal to 1.

In one subembodiment of the above embodiment, the K1 is greater than 1.

In one subembodiment of the above embodiment, each of the K1 condition(s) being satisfied is used to determine that the first condition set is satisfied.

In one subembodiment of the above embodiment, the size relation between the first data size and the first threshold is one of the K1 condition(s).

In one subembodiment of the above embodiment, a size relation between the first receive quality and the second threshold is one of the K1 condition(s).

In one embodiment, the first-type RA procedure comprises a 4-Step RACH.

In one embodiment, when the first data size is not less than the first threshold, and the first receive quality is not less than the second threshold, the first signal is transmitted.

In one embodiment, when the first data size is not less than the first threshold, and the first receive quality is not greater than the second threshold, the first signal is transmitted.

In one embodiment, the second signaling is transmitted via an air interface.

In one embodiment, the second signaling is transmitted via an antenna port.

In one embodiment, the second signaling comprises a downlink signaling.

In one embodiment, the second signaling comprises a sidelink signaling.

In one embodiment, the second signaling comprises all or part of a high-layer signaling.

In one embodiment, the second signaling comprises all or part of a higher-layer signaling.

In one embodiment, the second signaling comprises an RRC message.

In one embodiment, the second signaling comprises all or partial IE in an RRC message.

In one embodiment, the second signaling comprises all or partial fields of an IE in an RRC message.

In one embodiment, the second signaling comprises an SIB 1.

In one embodiment, the second signaling comprises an UplinkConfigCommon IE.

In one embodiment, the second signaling comprises an UplinkConfigCommonSIB IE.

In one embodiment, the second signaling comprises a BWP-Uplink IE.

In one embodiment, the second signaling comprises a BWP-UplinkCommon IE.

In one embodiment, the second signaling comprises a CellGroupConfig IE.

In one embodiment, the second signaling comprises a RACH-ConfigCommon IE.

In one embodiment, the second signaling comprises a RACH-ConfigCommonTwoStepRA IE.

In one embodiment, the second signaling comprises a RACH-ConfigDedicated IE.

In one embodiment, the second signaling comprises a RACH-ConfigGenericTwoStepRA IE.

In one embodiment, the second signaling comprises a RACH-ConfigGeneric IE.

In one embodiment, the second signaling comprises an SI-SchedulingInfo IE.

In one embodiment, the second signaling comprises a PRACH-Config IE.

In one embodiment, the second signaling comprises a RACH-ConfigCommon IE.

In one embodiment, the second signaling comprises a RACH-ConfigDedicated IE.

In one embodiment, the second signaling comprises a RadioResourceConfigCommon IE.

In one embodiment, the second signaling is the same as the first signaling.

In one embodiment, the second signaling is different from the first signaling.

In one embodiment, the second signaling and the first signaling are different IEs in a same RRC message.

In one embodiment, the second signaling and the first signaling are different fields in a same RRC message.

In one embodiment, the phrase of the second signaling being used to determine a second threshold includes: the second signaling comprises the second threshold.

In one embodiment, the phrase of the second signaling being used to determine a second threshold includes: the second signaling indicates the second threshold.

In one embodiment, the phrase of the second signaling being used to determine a second threshold includes: the second threshold is one field in the second signaling.

In one embodiment, the phrase of the second signaling being used to determine a second threshold includes: the second threshold is configured via the second signaling.

In one embodiment, the phrase of a measurement performed on the third signal being used to determine a first receive quality includes: the third signal is used to determine the first receive quality.

In one embodiment, the phrase of a measurement performed on the third signal being used to determine a first receive quality includes: the first receive quality is related to the third signal.

In one embodiment, the phrase of a measurement performed on the third signal being used to determine a first receive quality includes: the first node U01 performs a measurement on the third signal, and the acquired measurement result is equal to the first receive quality.

In one embodiment, the third signal is transmitted via an air interface.

In one embodiment, the third signal is transmitted via an antenna port.

In one embodiment, the third signal comprises a radio signal.

In one embodiment, the third signal comprises a baseband signal.

In one embodiment, the third signal comprises a PHY signal.

In one embodiment, the third signal comprises a reference signal.

In one embodiment, the third radio signal comprises a synchronization signal.

In one embodiment, the third signal comprises a downlink signal.

In one embodiment, the third signal comprises an uplink signal.

In one embodiment, the third signal comprises a Cell-specific Reference Signal (CRS).

In one embodiment, the third signal comprises a Primary Synchronization Signal (PSS).

In one embodiment, the third signal comprises a Secondary Synchronization Signal (SSS).

In one embodiment, the third signal comprises Phase-tracking Reference Signals (PT-RS).

In one embodiment, the third signal comprises Demodulation Reference Signals (DMRS).

In one embodiment, the third signal comprises a Channel-state Information Reference Signal (CSI-RS).

In one embodiment, the third signal comprises a Synchronization Signal Block (SSB).

In one embodiment, the first receive quality comprises a measurement result of a Bandwidth Part (BWP).

In one embodiment, the first receive quality comprises a measurement result of a beam.

In one embodiment, the first receive quality comprises a measurement result of a cell.

In one embodiment, the first receive quality comprises a measurement result of a carrier.

In one embodiment, the first receive quality comprises receive power.

In one embodiment, the first receive quality comprises at least one of a Reference Signal Received Power (RSRP), a Reference Signal Received Quality (RSRQ), a Received Signal Strength Indicator (RSSI), a Signal to Noise and Interference Ratio (SINR), or a Channel Status Information reference signal resource indicator (CRI).

In one embodiment, the first receive quality is measured by dBm.

In one embodiment, the first receive quality is measured by dB.

In one embodiment, the phrase of the first condition set comprising a size relation between the first receive quality and the second threshold includes: the first condition set is related to a size relation between the first receive quality and the second threshold.

In one embodiment, the phrase of the first condition set comprising a size relation between the first receive quality and the second threshold includes: a size relation between the first receive quality and the second threshold is a condition for judging whether the first condition set is satisfied.

In one embodiment, the phrase of a size relation between the first receive quality and the second threshold includes: the first receive quality is greater than the second threshold.

In one embodiment, the phrase of a size relation between the first receive quality and the second threshold includes: the first receive quality is not less than the second threshold.

In one embodiment, the phrase of a size relation between the first receive quality and the second threshold includes: the first receive quality is less than the second threshold.

In one embodiment, the phrase of a size relation between the first receive quality and the second threshold includes: the first receive quality is not greater than the second threshold.

In one embodiment, the phrase of a size relation between the first receive quality and the second threshold includes: the first receive quality is equal to the second threshold.

In one embodiment, the first condition set comprises a size relation between the first receive quality and the second threshold.

In one embodiment, the first condition set does not comprise a size relation between the first receive quality and the second threshold.

In one embodiment, the phrase that the fifth signal, the sixth signal and the seventh signal are used to perform the first-type RA procedure includes: the fifth signal, the sixth signal and the seventh signal are signals in the first-type RA procedure.

In one embodiment, the phrase that the fifth signal, the sixth signal and the seventh signal are used to perform the first-type RA procedure includes: the fifth signal is received in the first-type RA procedure, the sixth signal is transmitted in the first-type RA procedure, and the seventh signal is received in the first-type RA procedure.

In one embodiment, the fifth signal is transmitted via an air interface.

In one embodiment, the fifth signal is transmitted via an antenna port.

In one embodiment, the fifth signal is transmitted on a DL-SCH.

In one embodiment, the fifth signal comprises a second message in a 4-Step RACH procedure.

In one embodiment, the fifth signal comprises Msg 2.

In one embodiment, the fifth signal comprises a downlink signal.

In one embodiment, the fifth signal comprises a sidelink signal.

In one embodiment, the fifth signal comprises all or part of a MAC layer signaling.

In one embodiment, the fifth signal comprises all or part of a MAC PDU.

In one embodiment, the fifth signal comprises all or part of a MAC CE.

In one embodiment, the fifth signal comprises all or part of a MAC subheader.

In one embodiment, the fifth signal is addressed to an RA-RNTI.

In one embodiment, the fifth signal comprises a first RAR.

In one embodiment, the phrase of the fifth signal comprising a first RAR includes: the first RAR is all of the fifth signal.

In one embodiment, the phrase of the fifth signal comprising a first RAR includes: the first RAR is part of the fifth signal.

In one embodiment, the first RAR comprises a Backoff Indicator.

In one embodiment, the first RAR comprises a RAPID only.

In one embodiment, the first RAR comprises a MAC RAR.

In one subembodiment of the above embodiment, the MAC RAR comprises a Timing Advance Command (TAC).

In one subembodiment of the above embodiment, the MAC RAR comprises a UL Grant.

In one subembodiment of the above embodiment, the MAC RAR comprises a Temporary C-RNTI (TC-RNTI).

In one embodiment, the sixth signal is transmitted via an air interface.

In one embodiment, the sixth signal is transmitted via an antenna port.

In one embodiment, the sixth signal is transmitted on a CCCH.

In one embodiment, the sixth signal is transmitted on a DCCH.

In one embodiment, the sixth signal comprises an uplink signal.

In one embodiment, the sixth signal comprises a sidelink signal.

In one embodiment, the sixth signal comprises all or part of a high-layer signaling.

In one embodiment, the sixth signal comprises all or part of a higher-layer signaling.

In one embodiment, the sixth signal comprises a third message in a 4-Step RACH procedure.

In one embodiment, the sixth signal comprises Msg3.

In one embodiment, the sixth signal comprises an RRC message.

In one embodiment, the sixth signal comprises all or partial IEs in an RRC message.

In one embodiment, the sixth signal comprises all or partial fields in an IE in an RRC message.

In one embodiment, the sixth signal comprises all or part of a MAC layer signaling.

In one embodiment, the sixth signal comprises all or part of a MAC PDU.

In one embodiment, the sixth signal comprises all or part of a MAC CE.

In one embodiment, the sixth signal comprises all or part of a MAC subheader.

In one embodiment, the sixth signal is used for an RRC connection request.

In one embodiment, the sixth signal is used for an RRC Connection Re-establishment Request.

In one embodiment, the sixth signal is used for RRC Handover Confirm.

In one embodiment, the sixth signal is used for an RRC Connection Resume Request.

In one embodiment, the sixth signal is used for an RRC connection setup.

In one embodiment, the sixth signal is used for an RRC Early Data Request.

In one embodiment, the sixth signal is used for an RRC Small Data Request.

In one embodiment, the sixth signal comprises an RRCReestablishmentRequest message or an RRCConnectionReestablishmentRequest message.

In one embodiment, the sixth signal comprises an RRCResumeRequest message, or an RRCResumeRequest1 message, or an RRCConnectionResumeRequest message.

In one embodiment, the sixth signal comprises an RRCSetupRequest message.

In one embodiment, the sixth signal comprises an RRCConnectionRequest message.

In one embodiment, the sixth signal comprises an RRCEarlyDataRequest message.

In one embodiment, the sixth signal comprises an RRCSmallDataRequest message.

In one embodiment, the sixth signal comprises a Non-Access Stratum UE identity.

In one embodiment, the sixth signal comprises a C-RNTI.

In one embodiment, the sixth signal comprises an INACTIVE-RNTI (I-RNTI).

In one embodiment, the sixth signal comprises a BSR.

In one embodiment, the sixth signal comprises a first identity.

In one subembodiment of the above embodiment, the first identity comprises a Resume ID.

In one subembodiment of the above embodiment, the first identity comprises an s-TMSI.

In one subembodiment of the above embodiment, the first identity comprises an s-TMSI.

In one subembodiment of the above embodiment, the first identity comprises a fullI-RNTI.

In one subembodiment of the above embodiment, the first identity comprises a shortI-RNTI.

In one subembodiment of the above embodiment, the first identity comprises a ResumeCause.

In one subembodiment of the above embodiment, the first identity is used to indicate a ResumeCause.

In one subsidiary embodiment of the above subembodiment, the ResumeCause includes an SDT.

In one subsidiary embodiment of the above subembodiment, the ResumeCause includes an EDT.

In one subsidiary embodiment of the above subembodiment, the ResumeCause includes an mt-SDT.

In one subsidiary embodiment of the above subembodiment, the ResumeCause includes an mt-EDT.

In one subsidiary embodiment of the above subembodiment, the ResumeCause includes mo-Data.

In one embodiment, the sixth signal comprises the first data block.

In one embodiment, the sixth signal comprises an indicator of data size.

In one embodiment, the phrase that the sixth signal carries the first data block includes: the sixth signal comprises the first data block.

In one embodiment, the phrase that the sixth signal carries the first data block includes: the sixth signal comprises a PUSCH, and the PUSCH comprises the first data block.

In one embodiment, the phrase that the sixth signal carries the first data block includes: the first data block is transmitted through the sixth signal.

In one embodiment, the phrase that the sixth signal carries the first data block includes: the first data block is transmitted through Msg3.

In one embodiment, the seventh signal is transmitted via an air interface.

In one embodiment, the seventh signal is transmitted via an antenna port.

In one embodiment, the seventh signal is transmitted on a CCCH.

In one embodiment, the seventh signal is transmitted on a DCCH.

In one embodiment, the seventh signal comprises a fourth message in 4-Step RACH procedure.

In one embodiment, the seventh signal comprises Msg4.

In one embodiment, the seventh signal comprises a downlink signal.

In one embodiment, the seventh signal comprises a sidelink signal.

In one embodiment, the seventh signal comprises all or part of a high-layer signaling.

In one embodiment, the seventh signal comprises all or part of a higher-layer signaling.

In one embodiment, the seventh signal comprises an RRC message.

In one embodiment, the seventh signal comprises all or partial IEs in an RRC message.

In one embodiment, the seventh signal comprises all or partial fields in an IE in an RRC message.

In one embodiment, the seventh signal comprises all or part of a MAC layer signaling.

In one embodiment, the seventh signal comprises a MAC CE.

In one embodiment, the seventh signal comprises a MAC PDU.

In one embodiment, the seventh signal comprises a MAC SDU.

In one embodiment, the seventh signal comprises a MAC Subheader.

In one embodiment, the seventh signal comprises a padding.

In one embodiment, the seventh signal comprises a UE Contention Resolution Identity MAC CE.

In one embodiment, the seventh signal comprises Msg3.

In one embodiment, the seventh signal supports a Hybrid Automatic Repeat Request (HARQ).

In one embodiment, the seventh signal comprises an HARQ feedback.

In one embodiment, the seventh signal comprises being addressed to a C-RNTI.

In one embodiment, the seventh signal comprises being addressed to a Temporary C-RNTI.

In one embodiment, the seventh signal supports an HARQ.

In one embodiment, the seventh signal comprises a UE Contention Resolution Identity MAC CE.

In one embodiment, the seventh signal comprises a MAC PDU.

In one embodiment, the seventh signal comprises Msg4.

In one embodiment, the seventh signal comprises an RRCConnectionResume message or an RRCResume message.

In one embodiment, the seventh signal comprises an RRCConnectionRelease message or an RRCRelease message.

In one embodiment, the seventh signal comprises an RRCConnectionReject message or an RRCReject message.

In one embodiment, the seventh signal comprises an RRCSmallDataComplete message.

In one embodiment, the seventh signal comprises an RRCEarlyDataComplete message.

In one embodiment, the seventh signal comprises an RRCReestablishmentReject message, or an RRCConnectionReestablishmentReject message.

In one embodiment, the dotted box F1 is optional.

In one embodiment, the dotted box F1 exists.

In one embodiment, the dotted box F1 does not exist.

In one embodiment, when the dotted box F1 exists, the first condition set comprises a size relation between a first data size and the first threshold, and the first condition set comprises a size relation between the first receive quality and the second threshold.

In one embodiment, when the dotted box F1 does not exist, the first condition set comprises a size relation between a first data size and the first threshold, and the first condition set does not comprise a size relation between the first receive quality and the second threshold.

Embodiment 6

Figure 6:
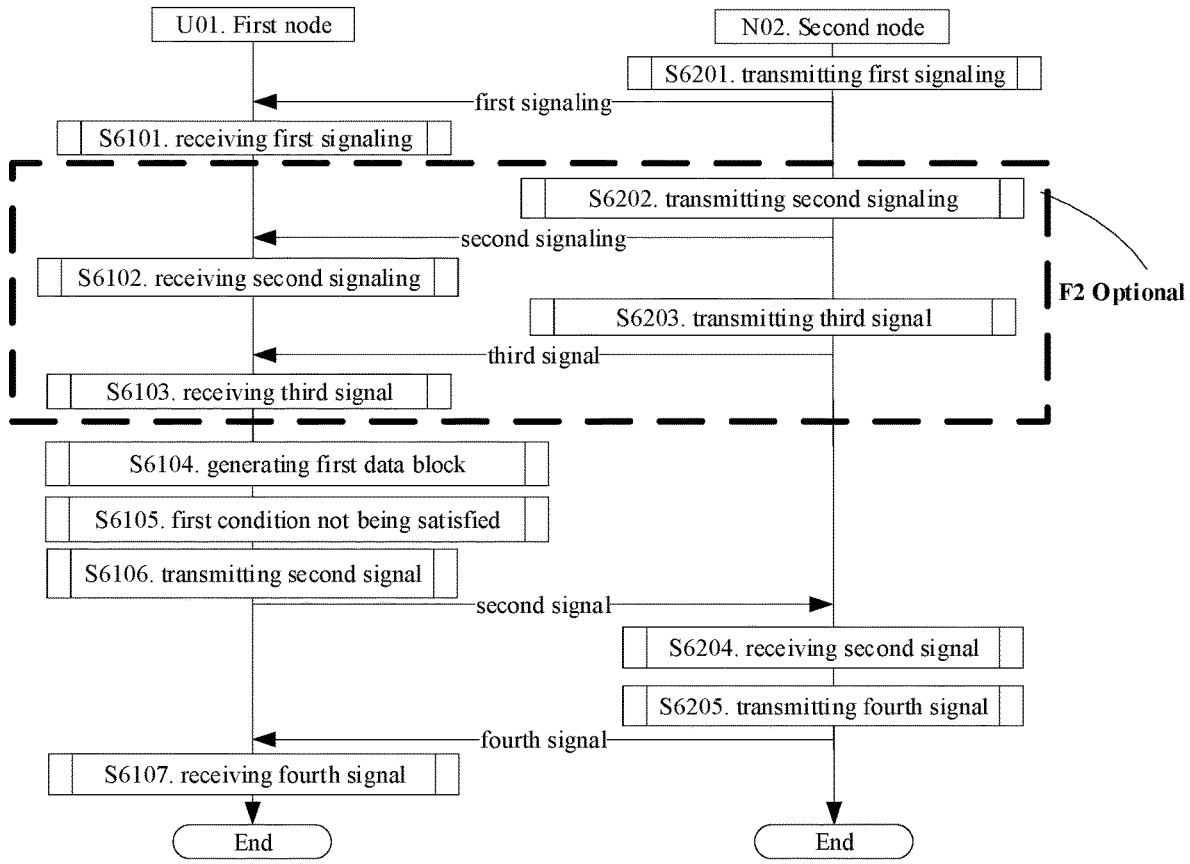
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. It is particularly underlined that the order illustrated in the embodiment does not put constraints over sequences of signal transmissions and implementations.

The first node U01 receives a first signaling in step S6101; receives a second signaling in step S6102; receives a third signaling in step S6103; generates a first data block in a first radio state in step S6104; a first condition set is not satisfied in step S6105; when the first condition set is not satisfied, transmits a second signal in step S6106; and in response to the second signal being transmitted, receives a fourth signal in step S6107.

The second node N02 transmits a first signaling in step S6201; transmits a second signaling in step S6202; transmits a third signal in step S6203; receives a second signal in step S6204; and transmits a fourth signal in step S6205.

In Embodiment 6, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the second signal is used for a second-type RA procedure; the second signal carries a second sequence; the first radio state comprises an RRC state; the second signaling is used to determine a second threshold; a measurement performed on the third signal is used to determine a first receive quality; the fourth signal is used to perform the first-type RA procedure, and the fourth signal comprises a second RAR; and the second signal carries the first data block.

In Embodiment 6, the first signaling is used to determine a first threshold, the first threshold is a positive integer; the first condition set comprises a size relation between a first data size and the first threshold; the first condition set comprises a size relation between the first receive quality and the second threshold; the first data block comprises more than one bit, and the first data size is equal to a number of bits comprised in the first data block; the second signal is used for a second-type RA procedure; the second signal carries a second sequence; the first radio state comprises an RRC state; the second signaling is used to determine a second threshold; a measurement performed on the third signal is used to determine a first receive quality; the fourth signal is used to perform the first-type RA procedure, and the fourth signal comprises a second RAR; and the second signal carries the first data block.

In one embodiment, the second-type RA procedure comprises a 2-Step RACH.

In one embodiment, when the first data size is not greater than the first threshold, and the first receive quality is not less than the second threshold, the second signal is transmitted.

In one embodiment, when the first data size is not greater than the first threshold, and the first receive quality is not greater than the second threshold, the second signal is transmitted.

In one embodiment, the phrase of in response to the second signal being transmitted includes a subsequent action after the second signal is transmitted.

In one embodiment, the phrase of in response to the second signal being transmitted includes when the second signal is transmitted.

In one embodiment, the fourth signal is transmitted via an air interface.

In one embodiment, the fourth signal is transmitted via an antenna port.

In one embodiment, the fourth signal comprises a second message in a 2-Step RACH procedure.

In one embodiment, the fourth signal comprises MsgB.

In one embodiment, the fourth signal comprises a downlink signal.

In one embodiment, the fourth signal comprises a sidelink signal.

In one embodiment, the second signal comprises a baseband signal.

In one embodiment, the fourth signal comprises all or part of a high-layer signaling.

In one embodiment, the fourth signal comprises all or part of a higher-layer signaling.

In one embodiment, the fourth signal comprises an RRC message.

In one embodiment, the fourth signal comprises all or partial IEs in an RRC message.

In one embodiment, the fourth signal comprises all or partial fields in an IE in an RRC message.

In one embodiment, the fourth signal comprises an RRCResume message.

In one embodiment, the fourth signal comprises an RRCRelease message.

In one embodiment, the fourth signal comprises an RRCReject message.

In one embodiment, the fourth signal comprises an RRCConnectionResume message.

In one embodiment, the fourth signal comprises a RRCConnectionRelease message.

In one embodiment, the fourth signal comprises an RRCConnectionReject message.

In one embodiment, the fourth signal comprises all or part of a MAC layer signaling.

In one embodiment, the fourth signal comprises a MAC CE.

In one embodiment, the fourth signal comprises a MAC PDU.

In one embodiment, the fourth signal comprises a MAC SDU.

In one embodiment, the fourth signal comprises Msg B.

In one embodiment, the fourth signal comprises Msg2 and Msg4.

In one embodiment, the fourth signal comprises a second RAR.

In one embodiment, the phrase of the fourth signal comprising a second RAR includes: the second RAR is all of the fourth signal.

In one embodiment, the phrase of the fourth signal comprising a second RAR includes: the second RAR is part of the fourth signal.

In one embodiment, the second RAR comprises an RAR of a 2-Step RACH.

In one embodiment, the second RAR comprises a MAC SDU.

In one embodiment, the second RAR comprises padding.

In one embodiment, the second RAR comprises a Backoff Indicator.

In one embodiment, the second RAR comprises a MAC Subheader.

In one embodiment, the second RAR comprises a successRAR.

In one subembodiment of the above embodiment, the successRAR comprises a UE Contention Resolution Identity.

In one subembodiment of the above embodiment, the successRAR comprises a TPC.

In one subembodiment of the above embodiment, the successRAR comprises an HARQ Feedback Timing Indicator.

In one subembodiment of the above embodiment, the successRAR comprises a PUCCH Resource Indicator.

In one subembodiment of the above embodiment, the successRAR comprises a TAC.

In one subembodiment of the above embodiment, the successRAR comprises a C-RNTI.

In one embodiment, the second RAR comprises a fallbackRAR.

In one subembodiment of the above embodiment, the fallbackRAR comprises a TAC.

In one subembodiment of the above embodiment, the fallbackRAR comprises a UL Grant.

In one subembodiment of the above embodiment, the fallbackRAR comprises a Temporary C-RNTI.

In one embodiment, the second signal carrying the first data block includes: the second signal comprises the first data block.

In one embodiment, the second signal carrying the first data block includes: the second signal comprises a PUSCH, and the PUSCH comprises the first data block.

In one embodiment, the second signal carrying the first data block includes: the first data block is transmitted through the second signal.

In one embodiment, the second signal carrying the first data block includes: the first data block and the first sequence are transmitted at the same time.

In one embodiment, the second signal carrying the first data block includes: the first data block is transmitted through MsgA.

In one embodiment, the phrase of the fourth signal being used to perform the first-type RA procedure includes: the fourth signal is a signal in the first-type RA procedure.

In one embodiment, the phrase of the fourth signal being used to perform the first-type RA procedure includes: the fourth signal is received in the first-type RA procedure.

In one embodiment, the dotted box F2 is optional.

In one embodiment, the dotted box F2 exists.

In one embodiment, the dotted box F2 does not exist.

In one embodiment, when the dotted box F2 exists, the first condition set comprises a size relation between a first data size and the first threshold, and the first condition set comprises a size relation between the first receive quality and the second threshold.

In one embodiment, when the dotted box F2 does not exist, the first condition set comprises a size relation between a first data size and the first threshold, and the first condition set does not comprise a size relation between the first receive quality and the second threshold.

Embodiment 7

Figure 7:
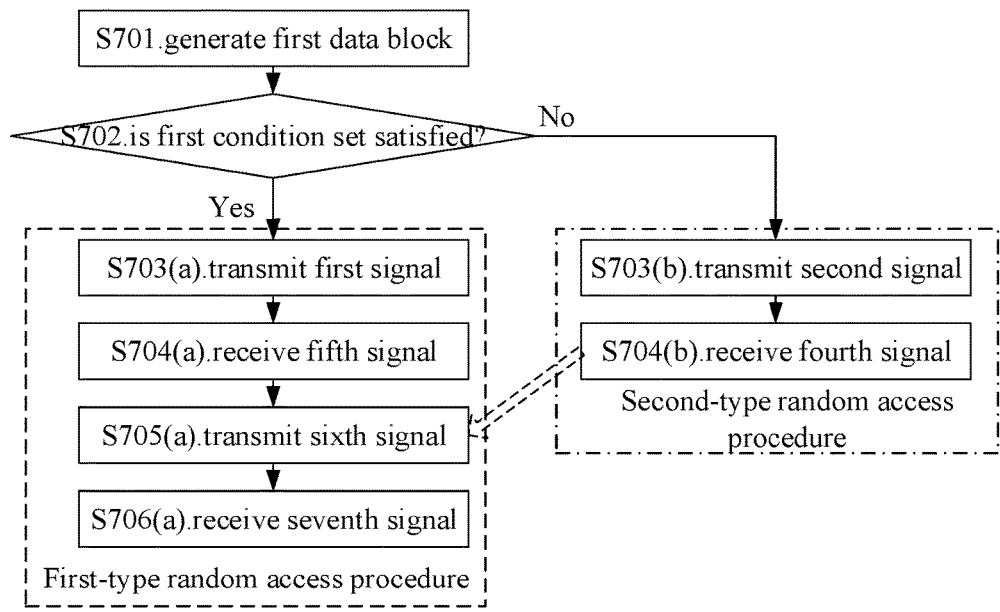
FIG. 7 illustrates a schematic diagram of a first condition set being used to determine performing a first-type RA procedure or a second-type RA procedure according to one embodiment of the present disclosure.

Embodiment 7 illustrates a schematic diagram of a first condition set being used to determine performing a first-type RA procedure or a second-type RA procedure according to one embodiment of the present disclosure. In FIG. 7, the solid diamond represents the judging module, the solid box represents the action module, the dotted box represents steps in a first-type RA procedure, and the dot-dash-line box represents steps in a second-type RA procedure.

In Embodiment 7, the first node generates a first data block in step S701; judges whether a first condition set is satisfied in step S702; if the first condition set is satisfied, transmits a first signal in step S703(a); receives a fifth signal in step S704(a); transmits a sixth signal in step S705(a); receives a seventh signal in step S706(a); if the first condition set is not satisfied, transmits a second signal in step S703(b); and receives a fourth signal in step S704(b).

In one embodiment, the first-type RA procedure comprises transmitting the first signal, receiving the fifth signal, transmitting the sixth signal and receiving the seventh signal.

In one embodiment, the second-type RA procedure comprises transmitting the second signal and receiving the fourth signal.

In one embodiment, when the first condition set is satisfied, the first-type RA procedure is performed; and when the first condition set is not satisfied, the second-type RA procedure is performed.

In one embodiment, the dotted arrow represents that the second-type RA procedure can fall back to the first-type RA procedure.

In one subembodiment of the above embodiment, when the fourth signal comprises a fallbackRAR, and the first node fallbacks from the second-type RA procedure to the first-type RA procedure.

In one subembodiment of the above embodiment, when falling back to the first-type RA procedure, the sixth signal is transmitted.

In one subembodiment of the above embodiment, the dotted arrow exists.

In one subembodiment of the above embodiment, the dotted arrow does not exist.

Embodiment 8

Figure 8:
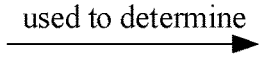
FIG. 8 illustrates a schematic diagram of a minimum value of a first buffer and a second buffer being used to determine a first threshold according to one embodiment of the present disclosure.

Embodiment 8 illustrates a schematic diagram of a minimum value of a first buffer and a second buffer being used to determine a first threshold according to one embodiment of the present disclosure. In FIG. 8, min{•} represents a symbol of taking a minimum value for {•}, min {a first buffer, a second buffer} represents a minimum value of the first buffer and the second buffer.

In Embodiment 8, a minimum value of a first buffer and a second buffer is used to determine the first threshold; the first buffer is used to determine a size of a buffer pool of the second signal, and the second buffer is used to determine a size of a buffer pool of the sixth signal.

In one embodiment, the phrase of a minimum value of a first buffer and a second buffer being used to determine the first threshold includes: taking a minimum value of the first buffer and the second buffer, and the first threshold is equal to the minimum value.

In one embodiment, the phrase of a minimum value of a first buffer and a second buffer being used to determine the first threshold includes: when the first buffer is greater than the second buffer, the first threshold=min{first buffer, second buffer}=second buffer.

In one embodiment, the phrase of a minimum value of a first buffer and a second buffer being used to determine the first threshold includes: when the first buffer is less than the second buffer, the first threshold=min{first buffer, second buffer}=first buffer.

In one embodiment, the phrase of a minimum value of a first buffer and a second buffer being used to determine the first threshold includes: when the first buffer is equal to the second buffer, the first threshold=min{first buffer, second buffer}=first buffer=second buffer.

In one embodiment, the phrase of the first buffer being used to determine a size of a buffer pool of the second signal includes: the first buffer is equal to a size of a buffer pool of the second signal.

In one embodiment, the phrase of the first buffer being used to determine a size of a buffer pool of the second signal includes: the first buffer is equal to a maximum capacity of the second signal.

In one embodiment, the phrase of the first buffer being used to determine a size of a buffer pool of the second signal includes: the first buffer comprises a maximum value of payload carried by the second signal.

In one embodiment, the phrase of the first buffer being used to determine a size of a buffer pool of the second signal includes: the first buffer comprises a maximum number of bits of data that can be carried by the second signal.

In one embodiment, the phrase of the second buffer being used to determine a size of a buffer pool of the sixth signal includes: the second buffer is equal to a size of a buffer pool of the sixth signal.

In one embodiment, the phrase of the second buffer being used to determine a size of a buffer pool of the second signal includes: the second buffer refers to a maximum capacity of the sixth signal.

In one embodiment, the phrase of the second buffer being used to determine a size of a buffer pool of the second signal includes: the second buffer comprises a maximum value of payload carried by the sixth signal.

In one embodiment, the phrase of the second buffer being used to determine a size of a buffer pool of the second signal includes: the second buffer comprises a maximum number of bits of data that can be carried by the sixth signal.

In one embodiment, the first buffer comprises a maximum value of MsgA.

In one embodiment, the first buffer comprises a MsgA buffer pool.

In one embodiment, the first buffer comprises a size of a CCCH.

In one embodiment, the second buffer comprises a maximum value of Msg3.

In one embodiment, the second buffer comprises a Msg3 buffer pool.

In one embodiment, the second buffer comprises a size of a CCCH.

In one embodiment, the phrase of the first signaling being used to determine a first threshold includes: the first signaling is used to determine a first buffer and a second buffer, and a minimum value of the first buffer and the second buffer is used to determine the first threshold.

Embodiment 9

Figure 9:
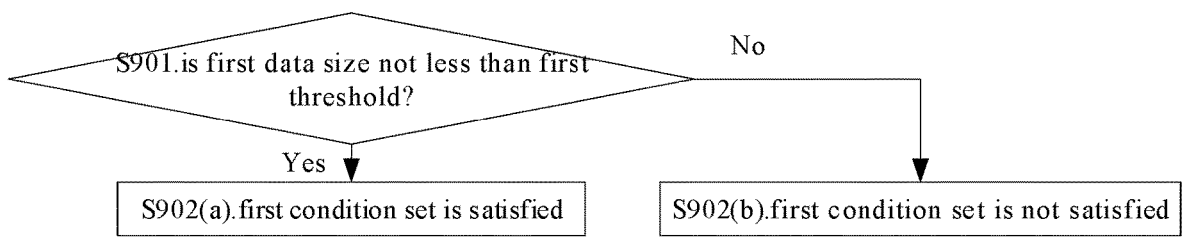
FIG. 9 illustrates a schematic diagram of a first data size not being less than a first threshold is used to determine that a first condition set is satisfied according to one embodiment of the present disclosure.

Embodiment 9 illustrates a schematic diagram of a first data size not being less than a first threshold is used to determine that a first condition set is satisfied according to one embodiment of the present disclosure, as shown in FIG. 9. In FIG. 9, each box represents a step. It is particularly underlined that the order illustrated in the embodiment does not put constraints over sequences of signal transmissions and implementations.

In Embodiment 9, the first data size not being less than the first threshold is used to determine that the first condition set is satisfied.

In one embodiment, the first node judges whether the first data size is not less than the first threshold in step S901; if the first data size is not less than the first threshold, determines that the first condition set is satisfied in step S902(a); otherwise determines that the first condition set is not satisfied in step S902(a).

In one embodiment, the phrase that the first data size not being less than the first threshold is used to determine that the first condition set is satisfied includes: the first condition set comprises that the first data size is not less than the first threshold.

In one embodiment, the phrase that the first data size not being less than the first threshold is used to determine that the first condition set is satisfied includes: when the first data size is not less than the first threshold, the first condition set is satisfied.

In one embodiment, when the first data size is greater than the first threshold, the first condition set is not satisfied.

Embodiment 10

Figure 10:
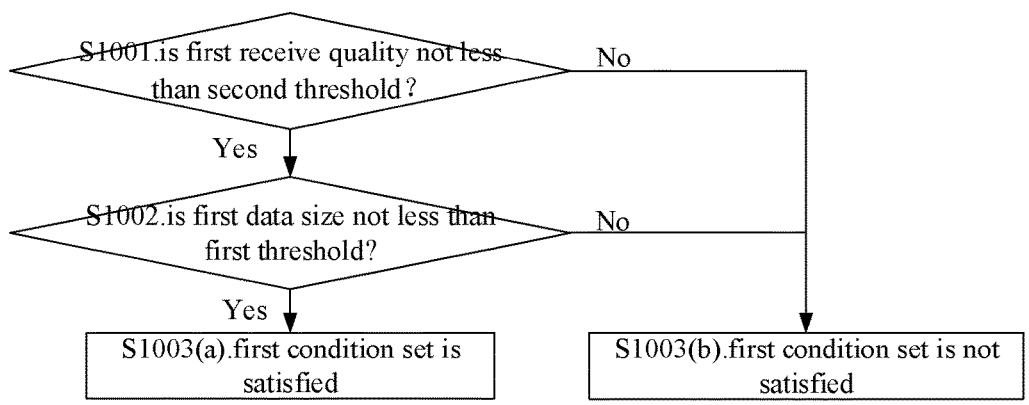
FIG. 10 illustrates a schematic diagram of a first data size not less than a first threshold and a first receive quality not less than a second threshold being used to determine that a first condition set is satisfied according to one embodiment of the present disclosure.

Embodiment 10 illustrates a schematic diagram of a first data size not less than a first threshold and a first receive quality not less than a second threshold being used to determine that a first condition set is satisfied according to one embodiment of the present disclosure, as shown in FIG. 10. In FIG. 10, each box represents a step. It is particularly underlined that the order illustrated in the embodiment does not put constraints over sequences of signal transmissions and implementations.

In Embodiment 10, the first node judges whether the first receive quality is not less than the second threshold in step S1001; if the first receive quality is not less than the second threshold, then continues to judge whether the first data size is not less than the first threshold in step S1002; otherwise determines that the first condition set is not satisfied in step S1003(b); if the first data size is not less than the first threshold, determines that the first condition set is satisfied in step S1003(a); otherwise determines that the first condition set is not satisfied in step S1003 (b).

In one embodiment, the phrase that the first data size not being less than the first threshold and the first receive quality not being less than the second threshold are used to determine that the first condition set is satisfied includes: the first condition set comprises that the first data size is not less than the first threshold, and the first condition set comprises that the first receive quality is not less than the second threshold.

In one embodiment, the phrase that the first data size not being less than the first threshold and the first receive quality not being less than the second threshold are used to determine that the first condition set is satisfied includes: when the first data size is not less than the first threshold, and the first receive quality is not less than the second threshold, the first condition set is satisfied.

In one embodiment, when the first data size is not less than the first threshold, and the first receive quality is less than the second threshold, the first condition set is not satisfied.

In one embodiment, when the first data size is less than the first threshold, and the first receive quality is not less than the second threshold, the first condition set is not satisfied.

In one embodiment, when the first data size is less than the first threshold, and the first receive quality is less than the second threshold, the first condition set is not satisfied.

Embodiment 11

Figure 11:
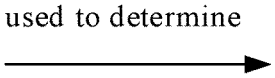
FIG. 11 illustrates a schematic diagram of a first data size not less than a third threshold being used to determine selecting a first sequence set according to one embodiment of the present disclosure.

Embodiment 11 illustrates a schematic diagram of a first data size not less than a third threshold being used to determine selecting a first sequence set according to one embodiment of the present disclosure, as shown in FIG. 11.

In Embodiment 11, the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a CCCH.

In one embodiment, the phrase of the first signaling being used to determine a third threshold includes: the first signaling comprises the third threshold.

In one embodiment, the phrase of the first signaling being used to determine a third threshold includes: the first signaling indicates the third threshold.

In one embodiment, the phrase of the first signaling being used to determine a third threshold includes: the first threshold is a field in the third signaling.

In one embodiment, the phrase of the first signaling being used to determine a third threshold includes: the first threshold is configured via the third signaling.

In one embodiment, the phrase that the first data size being not less than the third threshold is used to determine selecting a first sequence set includes when the first data size is not less than the third threshold, selecting the first sequence set.

In one embodiment, the phrase that the first data size being not less than the third threshold is used to determine selecting a first sequence set includes: a condition for selecting the first sequence set includes the first data size is not less than the third threshold.

In one embodiment, the phrase that the first sequence is a sequence in the first sequence set includes: the first sequence belongs to the first sequence set.

In one embodiment, the phrase that the first sequence is a sequence in the first sequence set includes: the first sequence is a sequence randomly selected out of the first sequence set.

In one embodiment, the phrase that the third threshold is related to a size of a CCCH includes: the third threshold is equal to a size of the CCCH.

In one embodiment, the phrase that the third threshold is related to a size of a CCCH includes: the third threshold is not less than a size of the CCCH.

In one embodiment, the third threshold is greater than an ra-Msg3SizeGroupA.

In one embodiment, the third threshold is greater than an ra-MsgASizeGroupA.

In one embodiment, the third threshold is equal to an ra-Msg3SizeGroupA.

In one embodiment, the third threshold is equal to an ra-MsgASizeGroupA.

In one embodiment, the third threshold is equal to messageSizeGroupA.

In one embodiment, an RA preamble comprises group A, group B and the first sequence set; when the first data size is less than an ra-Msg3SizeGroupA, the group A is selected; when the first data size is greater than an ra-Msg3SizeGroupA and the first data size is less than the third threshold, the group B is selected; and when the first data size is not less than the third threshold, the first sequence set is selected.

In one embodiment, when the first data size is less than an ra-Msg3SizeGroupA, the group A is selected; when the first data size is greater than an ra-Msg3SizeGroupA and the first data size is less than the third threshold, the group B is selected; and when the first data size is not less than the third threshold, the first sequence set is selected.

In one embodiment, determination of the preamble group is also related to a pathloss.

In one embodiment, the first sequence set comprises N1 first-type sequence(s).

In one subembodiment of the above embodiment, the first sequence is a sequence of the N1 first-type sequence(s).

In one subembodiment of the above embodiment, the first sequence comprises a preamble sequence.

In one subembodiment of the above embodiment, the first sequence comprises a preamble.

In one subembodiment of the above embodiment, the N1 is a positive integer.

In one subembodiment of the above embodiment, the N1 is a non-negative integer.

In one subembodiment of the above embodiment, the N1 is equal to 0.

In one subembodiment of the above embodiment, the N1 is greater than 0.

In one subembodiment of the above embodiment, the N1 is not greater than 64.

In one subembodiment of the above embodiment, the first signaling comprises a first value, the first value is used to determine a number of RA preamblesGroupA, and the first value comprises one of numberOfRA-Preambles, sizeOfRA-PreamblesGroupA, msgA-numberOfRA-PreamblesGroupA or numberofRA-PreamblesGroupA.

In one subembodiment of the above embodiment, the first signaling comprises a second value, and the first value is used to determine a number of RA-preamblesGroupB.

In one subembodiment of the above embodiment, the N1 is equal to the first value.

In one subembodiment of the above embodiment, the N1 is equal to a difference between 64 and the first value.

In one subembodiment of the above embodiment, the second value is equal to msgA-numberOfRA-PreamblesGroupB.

In one subembodiment of the above embodiment, the second value is equal to numberOfRA-PreamblesGroupB.

In one subembodiment of the above embodiment, the N1 is equal to a difference between 64 and {the first value+the second value}.

In one subembodiment of the above embodiment, the N1 is equal to msgA-numberOfRA-PreamblesGroupC.

In one subembodiment of the above embodiment, the N1 is equal to numberofRA-PreamblesGroupC.

Embodiment 12

Figure 12:
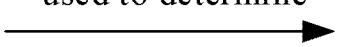
FIG. 12 illustrates a schematic diagram of a first signaling being used to determine X candidate sizes according to one embodiment of the present disclosure.

Embodiment 12 illustrates a schematic diagram of a first signaling used to determine X candidate sizes according to one embodiment of the present disclosure, as shown in FIG. 12.

In Embodiment 12, the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

In one embodiment, the first node determines the first data size in the X candidate sizes by itself.

In one embodiment, the first node determines the first data size in the X candidate sizes according to a size of the first data block.

In one embodiment, the X candidate sizes comprises the X TBSs.

In one embodiment, an i-th candidate size in the X candidate sizes is equal to $S_i$, and the i is a positive integer greater than 0 and not greater than the X.

In one subembodiment of the above embodiment, when the i is a positive integer greater than 1 and not greater than the X, and if the first data size is greater than $S_{i-1}$ and the first data size is not greater than $S_i$, the first data size is equal to $S_i$.

In one subembodiment of the above embodiment, when the i is equal to 1, and the first data size is not greater than $S_i$, the first data size is equal to $S_i$.

In one embodiment, the X candidate sequence sets comprises X preamble sequence groups.

In one embodiment, the X candidate sequence sets comprises the Group A, Group B and Group C.

In one embodiment, the phrase that the X candidate sizes are associated with X candidate sequence sets includes: one of the X candidate sizes corresponds to one of the X candidate sequence sets.

In one embodiment, the phrase that the X candidate sizes are associated with X candidate sequence sets includes: each of the X candidate sizes respectively corresponds to each of the X candidate sequence sets.

In one embodiment, the first data size corresponds to the first sequence set.

In one embodiment, the first data size is used to select a candidate size out of the X candidate sizes, and the selected candidate size is used to select a candidate sequence out of the X candidate sequence sets.

In one embodiment, the X is configurable.

In one embodiment, the phrase of the first signaling being used to determine X candidate sizes includes: the X candidate sizes is a field in the first signaling.

In one embodiment, the phrase of the first signaling being used to determine X candidate sizes includes: the first signaling comprises the X candidate sizes.

Embodiment 13

Figure 13:
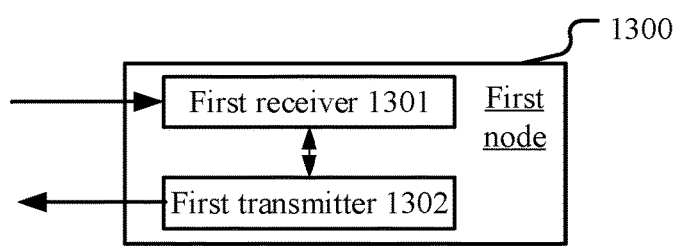
FIG. 13 illustrates a structure block diagram of a processing device in a first node according to one embodiment of the present disclosure.

Embodiment 13 illustrates a structure block diagram of a processing device in a first node according to one embodiment of the present disclosure; as shown in FIG. 13. In FIG. 13, the first node's processing device 1300 comprises a first receiver 1301 and a first transmitter 1302.

The first receiver 1301 receives a first signaling; and
the first transmitter 1302 generates a first data block in a first radio state; when a first condition set is satisfied, transmits a first signal; and when the first condition set is not satisfied, transmits a second signal;
in Embodiment 13, the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the first receiver 1301 receives a second signaling and a third signal; herein, the second signaling is used to determine a second threshold; a measurement performed on the third signal is used to determine a first receive quality; the first condition set comprises a size relation between the first receive quality and the second threshold.

In one embodiment, the first data size not being less than the first threshold is used to determine that the first condition set is satisfied; or the first data size not being less than the first threshold and the first receive quality not being less than the second threshold are used to determine that the first condition set is satisfied.

In one embodiment, the first data size not being less than the first threshold is used to determine that the first condition set is satisfied.

In one embodiment, the first data size not being less than the first threshold and the first receive quality not being less than the second threshold are used to determine that the first condition set is satisfied.

In one embodiment, the first receiver 1301, in response to the second signal being transmitted, receives a fourth signal; or, in response to the first signal being transmitted, receives a fifth signal; the first transmitter 1302, in response to the fifth signal being received, transmits a sixth signal; the first receiver 1301, in response to the sixth signal being transmitted, receives a seventh signal; herein, the fourth signal is used to perform the first-type RA procedure, and the fourth signal comprises a second RAR; the fifth signal, the sixth signal and the seventh signal are used to perform the first-type RA procedure, and the fifth signal comprises a first RAR; the second signal carries the first data block, or the sixth signal carries the first data block.

In one embodiment, the first receiver 1301, in response to the second signal being transmitted, receives a fourth signal; herein, the fourth signal is used to perform the first-type RA procedure, and the fourth signal comprises a second RAR; and the second signal carries the first data block.

In one embodiment, the first receiver 1301, in response to the first signal being transmitted, receives a fifth signal; the first transmitter 1302, in response to the fifth signal being received, transmits a sixth signal; the first receiver 1301, in response to the sixth signal being transmitted, receives a seventh signal; herein, the fifth signal, the sixth signal and the seventh signal are used to perform the first-type RA procedure, and the fifth signal comprises a first RAR; the sixth signal carries the first data block.

In one embodiment, a minimum value of a first buffer and a second buffer is used to determine the first threshold; the first buffer is used to determine a size of a buffer pool of the second signal, and the second buffer is used to determine a size of a buffer pool of the sixth signal.

In one embodiment, the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a CCCH.

In one embodiment, the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

In one embodiment, the first receiver 1301 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1301 comprises the antenna 452, the receiver 454, the multi-antenna receiving processor 458 and the receiving processor 456 in FIG. 4 of the present disclosure.

In one embodiment, the first receiver 1301 comprises the antenna 452, the receiver 454 and the receiving processor 456 in FIG. 4 of the present disclosure.

In one embodiment, the first transmitter 1302 comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1302 comprises the antenna 452, the transmitter 454, the multi-antenna transmitting processor 457 and the transmitting processor 468 in FIG. 4 of the present disclosure.

In one embodiment, the first transmitter 1302 comprises the antenna 452, the transmitter 454 and the transmitting processor 468 in FIG. 4 of the present disclosure.

Embodiment 14

Figure 14:
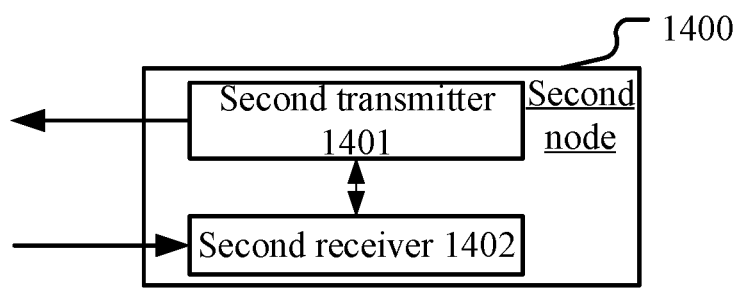
FIG. 14 illustrates a structure block diagram of a processing device in a second node according to one embodiment of the present disclosure.

Embodiment 14 illustrates a structure block diagram of a processing device in a second node according to one embodiment of the present disclosure; as shown in FIG. 14. In FIG. 14, the second node's processing device 1400 comprises a second transmitter 1401 and a second receiver 1402.

The second transmitter 1401 transmits a first signaling; and
the second receiver 1402, when the first condition set is satisfied, receives a first signal; when the first condition set is not satisfied, receives a second signal;

in Embodiment 14, a first data block is generated in a first radio state; the first signaling is used to determine a first threshold, the first threshold is a positive integer; the first condition set comprises a size relation between a first data size and the first threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state.

In one embodiment, the second transmitter 1401 transmits a second signaling and a third signal; herein, the second signaling is used to determine a second threshold; a measurement performed on the third signal is used to determine a first receive quality; the first condition set comprises a size relation between the first receive quality and the second threshold.

In one embodiment, the first data size not being less than the first threshold is used to determine that the first condition set is satisfied; or the first data size not being less than the first threshold and the first receive quality not being less than the second threshold are used to determine that the first condition set is satisfied.

In one embodiment, the first data size not being less than the first threshold is used to determine that the first condition set is satisfied.

In one embodiment, the first data size not being less than the first threshold and the first receive quality not being less than the second threshold are used to determine that the first condition set is satisfied.

In one embodiment, the second transmitter 1401, in response to the second signal being received, transmits a fourth signal; or, in response to the first signal being received, transmits a fifth signal; the second receiver 1402, in response to the fifth signal being transmitted, receives a sixth signal; the second transmitter 1401, in response to the sixth signal being received, transmits a seventh signal; herein, the fourth signal is used to perform the first-type RA procedure, and the fourth signal comprises a second RAR; the fifth signal, the sixth signal and the seventh signal are used to perform the first-type RA procedure, and the fifth signal comprises a first RAR; the second signal carries the first data block, or the sixth signal carries the first data block.

In one embodiment, the second transmitter 1401, in response to the second signal being received, transmits a fourth signal; herein, the fourth signal is used to perform the first-type RA procedure, and the fourth signal comprises a second RAR; and the second signal carries the first data block.

In one embodiment, the second transmitter 1401, in response to the first signal being received, transmits a fifth signal; the second receiver 1402, in response to the fifth signal being transmitted, receives a sixth signal; the second transmitter 1401, in response to the sixth signal being received, transmits a seventh signal; herein, the fifth signal, the sixth signal and the seventh signal are used to perform the first-type RA procedure, and the fifth signal comprises a first RAR; the sixth signal carries the first data block.

In one embodiment, a minimum value of a first buffer and a second buffer is used to determine the first threshold; the first buffer is used to determine a size of a buffer pool of the second signal, and the second buffer is used to determine a size of a buffer pool of the sixth signal.

In one embodiment, the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a CCCH.

In one embodiment, the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

In one embodiment, the second transmitter 1401 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1401 comprises the antenna 420, the transmitter 418, the multi-antenna transmitting processor 471 and the transmitting processor 416 in FIG. 4 of the present disclosure.

In one embodiment, the second transmitter 1401 comprises the antenna 420, the transmitter 418 and the transmitting processor 416 in FIG. 4 of the present disclosure.

In one embodiment, the second receiver 1402 comprises the antenna 420, the receiver 418, the multi-antenna receiving processor 472, the receiving processor 470, the controller/processor 475 and the memory 476 in FIG. 4 of the present disclosure.

In one embodiment, the second receiver 1402 comprises the antenna 420, the receiver 418, the multi-antenna receiving processor 472 and the receiving processor 470 in FIG. 4 of the present disclosure.

In one embodiment, the second receiver 1402 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, a second signaling and a third signal; and
a first transmitter, generating a first data block in a first radio state; when a first condition set is satisfied, transmitting a first signal; when the first condition set is not satisfied, transmitting a second signal;
wherein the first signaling is used to determine a first threshold, the first threshold is a positive integer; the second signaling is used to determine a second threshold; a measurement performed on the third signal is used to determine a first receive quality; the first condition set comprising the first data size is not greater than the first threshold; the first condition set comprising the first receive quality is greater than the second threshold; the first data block comprises more than one bit, and the first data size is equal to a number of bits comprised in the first data block; the first signal is used for a first-type Random Access (RA) procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state; the first threshold is used to determine selecting Small Data Transmission; the first-type RA procedure comprises a 2-Step RACH, the second-type RA procedure comprises a 2-Step RACH; or, the first-type RA procedure comprises a 4-Step RACH, the second-type RA procedure comprises a 4-Step RACH.

2. The first node according to claim 1,
wherein the first signal comprises a MsgA, and the MsgA comprises the first sequence and a payload; the payload comprises one of an RRCResumeRequest1 message or an RRCResumeRequest message; the payload comprises a Buffer Status Report (BSR).

3. The first node according to claim 1, wherein the first radio state comprises an RRC_INACTIVE state; the first signaling comprises a System Information Block1 (SIB1); the second signaling comprises an SIB1; the second signaling is the same as the first signaling.

4. The first node according to claim 1, comprising:
the first receiver, in response to the second signal being transmitted, receiving a fourth signal; or, in response to the first signal being transmitted, receiving a fifth signal;
the first transmitter, in response to the fifth signal being received, transmitting a sixth signal; and
the first receiver, in response to the sixth signal being transmitted, receiving a seventh signal;
wherein the fourth signal is used to perform the second-type RA procedure, and the fourth signal comprises a second Random Access Response (RAR); the fifth signal, the sixth signal and the seventh signal are used to perform the first-type RA procedure, and the fifth signal comprises a first RAR; the second signal carries the first data block, or the sixth signal carries the first data block.

5. The first node according to claim 4, wherein the sixth signal comprises an RRCResumeRequest message or an RRCResumeRequest1 message; the sixth signal comprises a BSR.

6. The first node according to claim 1, wherein the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a Common Control Channel (CCCH).

7. The first node according to claim 1, wherein the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

8. A second node for wireless communications, comprising:
a second transmitter, transmitting a first signaling, a second signaling and a third signal; and
a second receiver, receiving a first signal or a second signal;
wherein when a first condition set is satisfied, the first signal is transmitted by a receiver of the first signaling; when the first condition set is not satisfied, the second signal is transmitted by a receiver of the first signaling; a first data block is generated by the receiver of the first signaling in a first radio state; the first signaling is used to determine a first threshold, the first threshold is a positive integer; the second signaling is used to determine a second threshold; a measurement performed on the third signal is used to determine a first receive quality; the first condition set comprising the first data size is not greater than the first threshold; the first condition set comprising the first receive quality is greater than the second threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state; the first threshold is used to determine selecting Small Data Transmission; the first-type RA procedure comprises a 2-Step RACH, the second-type RA procedure comprises a 2-Step RACH; or, the first-type RA procedure comprises a 4-Step RACH, the second-type RA procedure comprises a 4-Step RACH.

9. The second node according to claim 8, wherein the first signal comprises a MsgA, and the MsgA comprises the first sequence and a payload; the payload comprises one of an RRCResumeRequest1 message or an RRCResumeRequest message; the payload comprises a BSR.

10. The second node according to claim 8, wherein the first radio state comprises an RRC_INACTIVE state; the first signaling comprises a System Information Block1 (SIB1); the second signaling comprises an SIB1.

11. The second node according to claim 8, comprising:
the second transmitter, in response to the second signal being received, transmitting a fourth signal; or, in response to the first signal being received, transmitting a fifth signal;

the second receiver, in response to the fifth signal being transmitted, receiving a sixth signal; and the second transmitter, in response to the sixth signal being received, transmitting a seventh signal;

wherein the fourth signal is used to perform the second-type RA procedure, and the fourth signal comprises a second RAR; the fifth signal, the sixth signal and the seventh signal are used to perform the first-type RA procedure, and the fifth signal comprises a first RAR; the second signal carries the first data block, or the sixth signal carries the first data block.

12. The second node according to claim 8, wherein the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a CCCH.

13. The second node according to claim 8, wherein the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

14. A method in a first node for wireless communications, comprising:

receiving a first signaling, a second signaling and a third signal; and generating a first data block in a first radio state; when a first condition set is satisfied, transmitting a first signal; when the first condition set is not satisfied, transmitting a second signal;

wherein the first signaling is used to determine a first threshold, the first threshold is a positive integer; the second signaling is used to determine a second threshold; a measurement performed on the third signal is used to determine a first receive quality; the first condition set comprising the first data size is not greater than the first threshold; the first condition set comprising the first receive quality is greater than the second threshold; the first data block comprises more than one bit, and the first data size is equal to a number of bits comprised in the first data block; the first signal is used for a first-type RA procedure, the second signal is used for a second-type RA procedure, and the first-type RA procedure is different from the second-type RA procedure; the first signal carries a first sequence, the second signal carries a second sequence, and the first sequence is different from the second sequence; the first radio state comprises an RRC state; the first threshold is used to determine selecting Small Data Transmission; the first-type RA procedure comprises a 2-Step RACH, the second-type RA procedure comprises a 2-Step RACH; or, the first-type RA procedure comprises a 4-Step RACH, the second-type RA procedure comprises a 4-Step RACH.

15. The method in a first node for wireless communications according to claim 14, wherein the first signal comprises a MsgA, and the MsgA comprises the first sequence and a payload; the payload comprises one of an RRCResumeRequest1 message or an RRCResumeRequest message; the payload comprises a BSR.

16. The method in a first node for wireless communications according to claim 14, wherein the first radio state comprises an RRC_INACTIVE state; the first signaling comprises a System Information Block1 (SIB1); the second signaling comprises an SIB1.

17. The method in a first node for wireless communications according to claim 14, comprising:

in response to the second signal being transmitted, receiving a fourth signal; or, in response to the first signal being transmitted, receiving a fifth signal;

in response to the fifth signal being received, transmitting a sixth signal; and in response to the sixth signal being transmitted, receiving a seventh signal;

wherein the fourth signal is used to perform the second-type RA procedure, and the fourth signal comprises a second RAR; the fifth signal, the sixth signal and the seventh signal are used to perform the first-type RA procedure, and the fifth signal comprises a first RAR; the second signal carries the first data block, or the sixth signal carries the first data block.

18. The method in a first node for wireless communications according to claim 17, wherein the sixth signal comprises an RRCResumeRequest message or an RRCResumeRequest1 message; the sixth signal comprises a BSR.

19. The method in a first node for wireless communications according to claim 14, wherein the first signaling is used to determine a third threshold, and the third threshold is a positive integer; the first data size not being less than the third threshold is used to determine a selection of a first sequence set, and the first sequence is a sequence in the first sequence set; and the third threshold is related to a size of a CCCH.

20. The method in a first node for wireless communications according to claim 14, wherein the first signaling is used to determine X candidate sizes, the first data size belongs to one of the X candidate sizes, X being a positive integer greater than 1; the X candidate sizes are associated with X candidate sequence sets, and the first sequence set is one of the X candidate sequence sets.

* * * * *